United States Patent [19]

Yamaguchi

[11] Patent Number: 5,011,294
[45] Date of Patent: Apr. 30, 1991

[54] ELECTRONIC CLINICAL THERMOMETER

[75] Inventor: Keiji Yamaguchi, Shimizu, Japan

[73] Assignee: Terumo Kabushiki Kaisha, Tokyo, Japan

[21] Appl. No.: 584,344

[22] Filed: Sep. 18, 1990

Related U.S. Application Data

[62] Division of Ser. No. 363,892, filed as PCT JP87/00865 on Nov. 11, 1987.

[30] Foreign Application Priority Data

Nov. 19, 1986 [JP] Japan .................. 61-274088
Nov. 19, 1986 [JP] Japan .................. 61-274089

[51] Int. Cl.$^5$ .................. G06F 15/42; G01K 3/00
[52] U.S. Cl. .................. 374/107; 374/169; 128/736; 364/413.03; 364/557
[58] Field of Search .......... 374/102, 103, 107, 169; 128/736; 364/557, 413.03, 570, 571.04, 571.02

[56] References Cited

U.S. PATENT DOCUMENTS

| | | | |
|---|---|---|---|
| 3,111,032 | 11/1963 | Wormser et al. | 374/169 |
| 3,280,312 | 10/1966 | Sandelien | 374/169 |
| 3,702,076 | 11/1972 | Georgi | 374/169 |
| 3,878,724 | 4/1975 | Allen | 374/134 |
| 3,878,728 | 4/1975 | Marzetta | 374/134 |
| 3,978,325 | 8/1976 | Goldstein et al. | 374/169 |
| 4,068,526 | 1/1978 | Goldstein | 374/169 |
| 4,092,863 | 6/1978 | Turner | 374/169 |
| 4,541,734 | 9/1985 | Ishizaka | 374/169 |
| 4,574,359 | 3/1986 | Ishizaka et al. | 374/169 |
| 4,629,336 | 12/1986 | Ishizaka | 374/169 |
| 4,648,055 | 3/1987 | Ishizaka et al. | 374/107 |
| 4,727,500 | 2/1988 | Jackson et al. | 128/736 |
| 4,811,198 | 3/1989 | Ota et al. | 374/169 |
| 4,843,577 | 6/1989 | Muramoto | 374/169 |
| 4,866,621 | 9/1989 | Ono | 374/107 |
| 4,878,184 | 10/1989 | Okada et al. | 374/107 |

FOREIGN PATENT DOCUMENTS

| | | | |
|---|---|---|---|
| 234236A | 9/1987 | European Pat. Off. | 374/169 |
| 53-27084 | 3/1978 | Japan | 374/169 |
| 55-71919 | 5/1980 | Japan | 374/169 |
| 55-125423 | 9/1980 | Japan | 374/169 |
| 58-225325 | 12/1983 | Japan | 374/169 |
| 59-187233 | 10/1984 | Japan . | |
| 61-70429 | 4/1986 | Japan . | |
| 283632 | 10/1970 | U.S.S.R. | 374/169 |

Primary Examiner—Thomas B. Will
Assistant Examiner—Diego F. F. Gutierrez
Attorney, Agent, or Firm—Staas & Halsey

[57] ABSTRACT

An electronic clinical thermometer for predicting a sensed temperature that will prevail at a future time is equipped with a predetermined predictive functional formula in which values of predetermined coefficient parameters for superimposing the prediction function on a sensed temperature curve are undetermined. Temperature data indicative of sensed body temperature are stored in correlation with elapsed time from the start of measurement, and plural items of the temperature data are read out by a predetermined method as measurement proceeds. By performing regression analysis based on a plurality of the predictive functional formulae, or by solving simultaneous equations constituted by the plurality of predicitve functional formulae, in which the sensed temperature data that have been read serve as purposive variables and functions of time data related to the temperature data serve as explicative variables, the values of the coefficient parameters are set. Prediction processing is executed to calculate sensed temperature that will prevail at a future time in accordance with the predictive functional formula specified by the set values of the coefficient parameters.

4 Claims, 17 Drawing Sheets

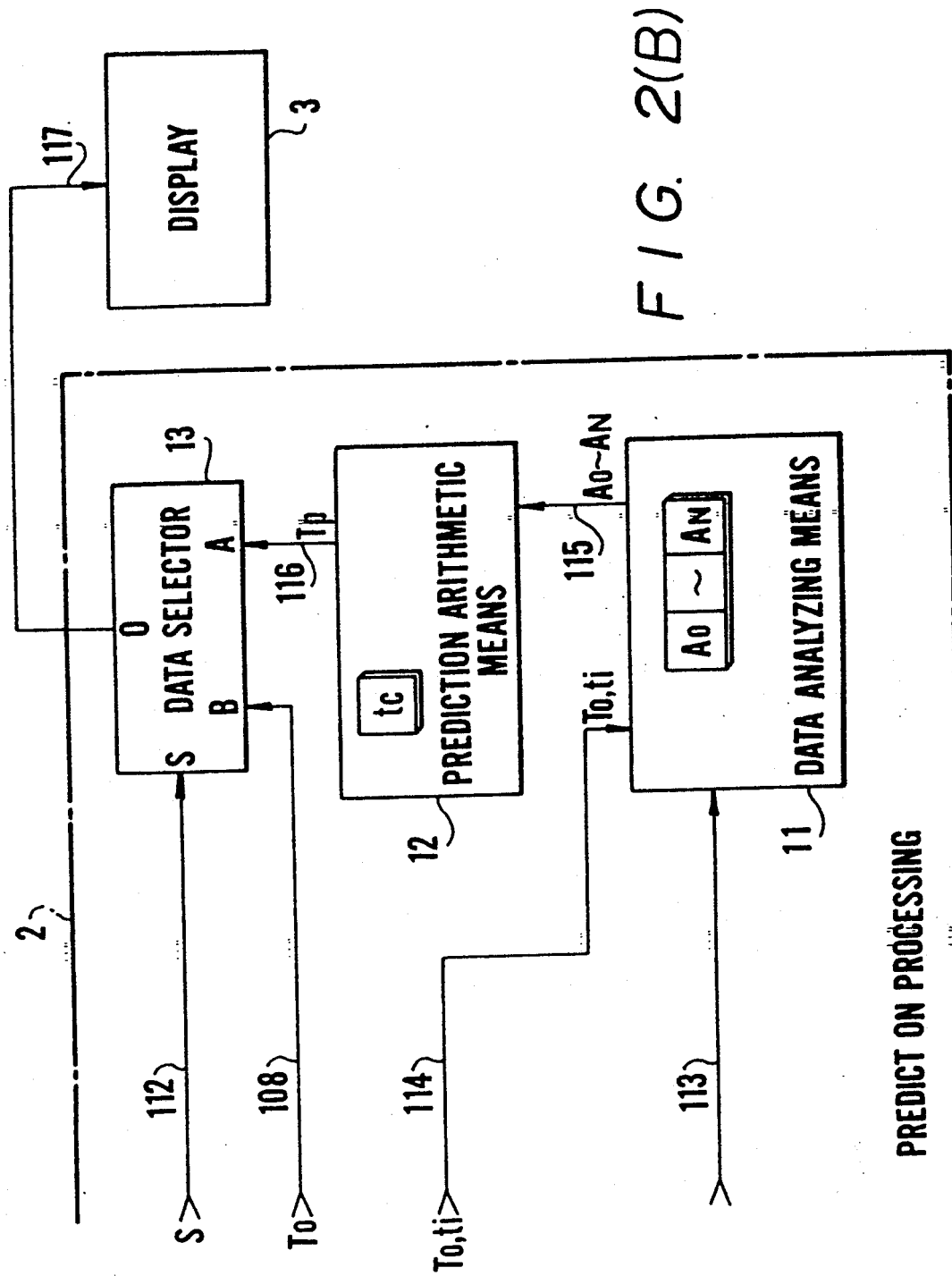

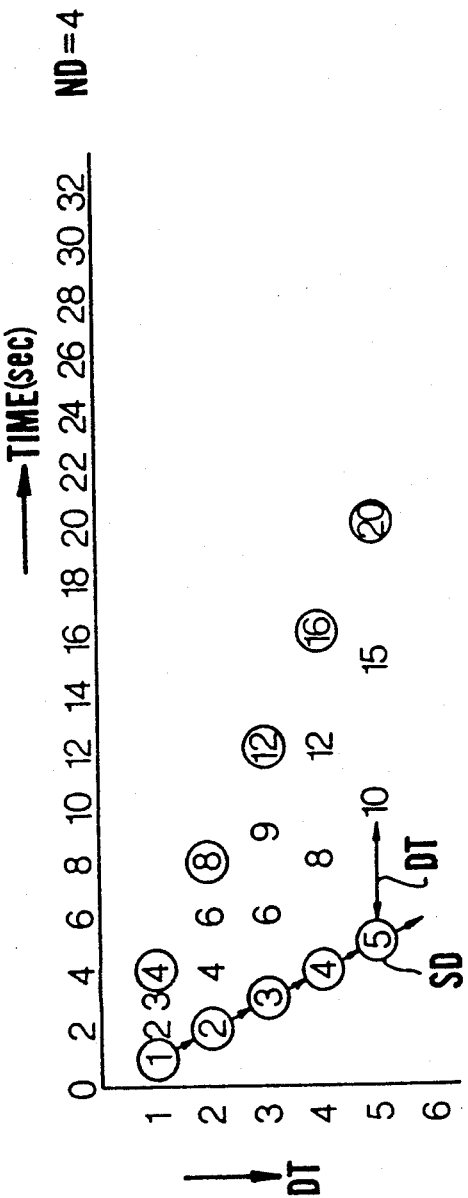
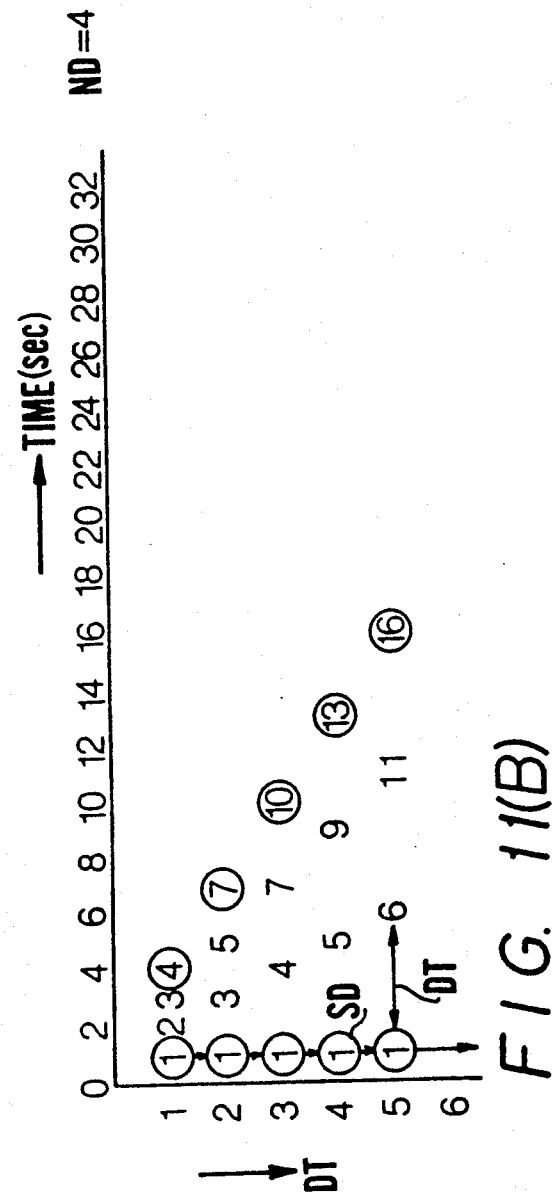
FIG. 11(A)
FIG. 11(B)

ELECTRONIC CLINICAL THERMOMETER

This is a divisional of copending application Ser. No. 07/363,892 filed. International application PCT/JP87/00865 filed on Nov. 11, 1987 and which designated the U.S.

FIELD OF THE INVENTION

This invention relates to an electronic clinical thermometer, and more particularly, to an electronic clinical thermometer capable of predicting what an actually sensed temperature will be at a future time.

BACKGROUND OF THE INVENTION

In a conventional electronic clinical thermometer for measuring the temperature of a living body, the thermometer is programmed to incorporate a prediction formula set up to perfectly define temperature rise curves, and a so-called "add-on value" determined by the prediction formula is added to an actually sensed temperature to obtain an early display of what the equilibrium temperature should eventually be. To this end, it is required that constants (parameters) used in the prediction formula be set to values which will statistically minimize a prediction error. This is done in the manufacturing process of each electronic clinical thermometer by applying statistical processing to actual measurement values obtained from a temperature probe used in actually measuring temperature.

It is known that temperature rise curves differ from one individual to another, and that a temperature rise curve when temperature is sensed in an armpit will differ considerably from that when temperature is sensed orally even for one and the same individual. As a result, an early display of an accurately predicted equilibrium temperature cannot be obtained in actual practice even if the prediction formula is corrected for dispersion exhibited by the thermal characteristics of the probe.

An electronic clinical thermometer disclosed in the specification of Japanese Patent Application Laid-Open (KOKAI) No. 58-225336 solves the above problem by incorporating a plurality of prediction formulae. More specifically, the thermometer is provided beforehand with a plurality of prediction formulae stipulated by statistical processing based on a large quantity of measurement results. When temperature is actually measured, condition settings are altered on a trial-and-error basis, such as by comparing the rise curve of the temperature being measured and a selected one of the prediction formulae. In other words, the parameters in the selected prediction formula are modified by trial and error to solve the aforementioned problem encountered in the prior art. However, since the plural prediction formulae must be defined in advance, a practical problem that cannot be avoided is the trouble involved in adjusting for dispersion in the thermal characteristics of the temperature probes when these probes are mass-produced. Furthermore, in order to raise the accuracy of prediction, a large number of prediction formulae having different rise curves must be incorporated in the thermometer in advance. Moreover, if an improper prediction formula is selected just as temperature is starting to rise, the transition exhibited by the predicted value may overshoot.

An electronic clinical thermometer disclosed in the specification of Japanese Patent Application Laid-Open (KOKAI) No. 59-187233 solves this problem by setting up a prediction formula which conforms to the rise curve of the actually measured temperature. In other words, use is made of the fact that a linear relationship $(TL = A - \tau' t)$ exists between a logarithmic value TL of the time differential of measured body temperature and a sampling time t, with A and $\tau'$ being determined by a regression method. However, since the logarithmic value TL is not measured body temperature per se, an error due to differential and logarithmic calculations is introduced into the temperature data, and the error has a major influence on the setting of the constants A and $\tau'$. Moreover, if the measured temperature data include a noise component, the latter affects the predictive results in the manner of an exponential function, causing the predicted values to exhibit a highly unstable transition.

SUMMARY OF THE INVENTION

Accordingly, an object of the present invention is to provide an electronic clinical thermometer in which an accurate early display of temperature is obtained even if temperature rise curves differ due to variability or dispersion in the thermal characteristics of a probe, differences among individuals and differences in the region of the body where temperature is sensed.

Another object of the present invention is to provide an electronic clinical thermometer in which a stable transition in predicted temperature is obtained even if sensed temperature contains a noise component.

Still another object of the present invention is to provide an electronic clinical thermometer in which sensed temperature which will prevail at any future time is predicted easily and accurately.

Yet another object of the present invention is to provide an electronic clinical thermometer in which an equilibrium temperature value which will prevail in the future upon elapse of an extended period of time is accurately predicted.

A further object of the present invention is to provide an electronic clinical thermometer which attains the foregoing objects through a simple construction and a simple data processing method.

According to the present invention, the foregoing objects are attained by providing an electronic clinical thermometer comprising first memory means for storing a predetermined predictive functional formula in which values of predetermined coefficient parameters for superimposing said prediction function on a sensed temperature curve are undetermined, temperature sensing means for sensing temperature and generating temperature data indicative of the temperature sensed, time signal generating means for measuring elapsed time from start of temperature measurement and generating time data indicative of the measured elapsed time, second memory means for storing the sensed temperature data in a manner correlated with the time data that prevailed when the temperature data were sensed, data reading means for reading plural items of temperature data out of the second memory means by a predetermined method as measurement proceeds, signal analyzing means for setting the values of the coefficient parameters by performing regression analysis based on a plurality of the predictive functional formulae in which the read temperature data serve as purposive variables and functions of the time data related to these temperature data serve as explicative variables, and prediction processing means for calculating sensed temperature that will prevail at a future time in accordance with the predictive functional formula specified by the set values of the coefficient parameters.

In a preferred embodiment, the signal analyzing means sets the values of coefficient parameters $A_0$, $A_1$, $A_2$, ..., $A_n$ of the prediction functional formula by performing regression analysis based on a plurality of predictive functional formulae:

$$T_0(t_i) = A_0 + A_1/t_i + A_2/t_i^2 + A_3/t_i^3 + \ldots A_n/t_i^n$$

$(i = 1 - N)$ in which read temperature data $T_0(t_i)$ serve as purposive variables and functions $1/t_i$, $1/t_i^2$, $1/t_i^3$, ..., $1/t_i^n$ of time data related to these temperature data serve as explicative variables.

In a preferred embodiment, the prediction processing means performs prediction processing by calculating a sensed temperature $T_p(t_c)$, which will prevail at a future time $t_c$, in accordance with the following equation:

$$T_p(t_c) = A_0 + A_1/t_c + A_2/t_c^2 + A_3/t_c^3 + \ldots + A_n/t_c^n$$

based on a predictive functional formula specified by the values of the respective coefficient parameters $A_0$, $A_1$, $A_2$, ..., $A_n$ set by the signal analyzing means.

In a preferred embodiment, the data reading means reads plural items of temperature data in such a manner that the time interval of time data related to plural items of temperature data read later is greater than the time interval of time data related to a plural items of temperature data read previously.

Further, in accordance with the invention, the foregoing objects are attained by providing an electronic clinical thermometer comprising first memory means for storing a predetermined predictive functional formula in which values of predetermined coefficient parameters for superimposing said prediction function on a sensed temperature curve are undetermined, temperature sensing means for sensing temperature and generating temperature data indicative of the temperature sensed, time signal generating means for measuring elapsed time from start of temperature measurement and generating time data indicative of the measured elapsed time, second memory means for storing the sensed temperature data in a manner correlated with the time data that prevailed when the temperature data were sensed, data reading means for reading plural items of temperature data out of the second memory means by a predetermined method as measurement proceeds, signal analyzing means for setting the values of the coefficient parameters by solving simultaneous equations constituted by a plurality of the predictive functional formulae, in which the read temperature data serve as purposive variables and functions of the time data related to these temperature data serve as explicative variables, and prediction processing means for calculating sensed temperature that will prevail at a future time in accordance with said predictive functional formula specified by the set values of the coefficient parameters.

In a preferred embodiment, the signal analyzing means sets the values of coefficient parameters $A_0$, $A_1$, $A_2$, ..., $A_N$ of the prediction functional formula by solving the following simultaneous equations constituted by the plurality of predictive functional formulae:

$$T_0(t_i) = A_0 + A_1/t_i + A_2/t_i^2 + A_3/t_i^3 + \ldots A_N/t_i^N$$

$(i = 0 - N)$ in which read temperature data $T_0(t_i)$ serve as purposive variables and functions $1/t_i$, $1/t_i^2$, $1/t_i^3$, ..., $1/t_i^N$ of time data related to these temperature data serve as explicative variables.

In a preferred embodiment, the prediction processing means performs prediction processing by calculating a sensed temperature $T_p(t_c)$, which will prevail at a future time $t_c$, in accordance with the following equation:

$$T_p(t_c) = A_0 + A_1/t_c + A_2/t_c^2 + A_3/t_c^3 + \ldots + A_N/t_c^N$$

based on a predictive functional formula specified by the values of the respective coefficient parameters $A_0$, $A_1$, $A_2$, ..., $A_N$ set by the signal analyzing means.

In a preferred embodiment, the data reading means reads plural items of temperature data in such a manner that the time interval of time data related to plural items of temperature data read later is greater than the time interval of time data related to a plural items of temperature data read previously.

BRIEF DESCRIPTION OF THE DRAWINGS

FIGS. 2(A) and 2(B) are a block diagram illustrating the specific construction of a first embodiment of the electronic clinical thermometer according to the invention;

FIGS. 11(A) and 11(B) are views showing the manner in which data are written into and read out of memory means in the second embodiment;

DESCRIPTION OF THE PREFERRED EMBODIMENTS

Preferred embodiments of the invention will now be described in detail with reference to the accompanying drawings.

Figure 1:
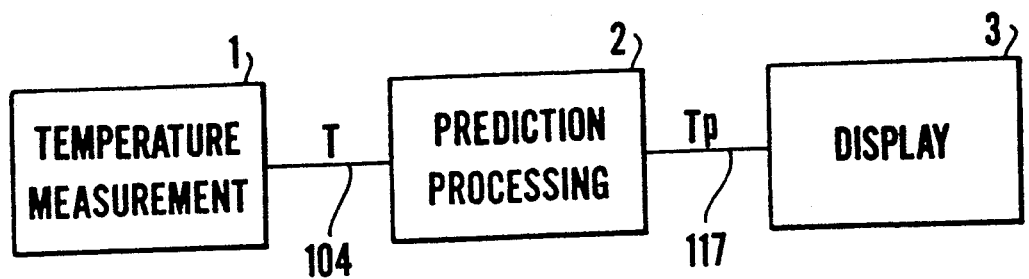
FIG. 1 is a block diagram illustrating the basic construction of an electronic clinical thermometer embodying the present invention.

FIG. 1 is a block diagram illustrating the basic construction of an electronic clinical thermometer embodying the present invention. The thermometer basically comprises a temperature measurement section 1, a prediction processing section 2, and a display section 3.

The temperature measurement section 1 senses the temperature at a part of a living body at a predetermined period and outputs temperature data T, which represents the sensed temperature, over a line 104.

The prediction processing section 2 incorporates predictive functional formulae in which the values of predetermined coefficient parameters capable of reflecting sensed temperature curves are undetermined. Before measurement starts, the prediction processing section 2 monitors the sensed temperature data T from the measurement section 1 to determine whether predetermined conditions for starting measurement have been satisfied. Once measurement has started, the prediction processing section 2 successively stores the sensed temperature data T from the measurement section 1 in such a manner that the data are correlated with time data t, which are measured at each temperature sensing instant, obtained from an internal function which keeps track of elapsed measurement time. Whenever a predetermined number of the items of sensed temperature data are accumulated, a predetermined number of items of sensed temperature data T are read from this group of temperature data by a predetermined method. By performing regression analysis based on a plurality of the predictive functional formulae, or by solving simultaneous equations constituted by the plurality of predictive functional formulae, in which the sensed temperature data T that have been read serve as purposive variables and functions of time data related to the temperature data serve as explicative variables, the values of the coefficient parameters of these predictive functional formulae are set so as to reflect a curve of the temperature sensed. Next, the processing section 2 performs prediction processing to calculate sensed temperature which will prevail at a future time in accordance with a predictive functional formula specified by the set values of the coefficient parameters. The processing section 2 outputs the results of the calculation, namely a predicted temperature $T_p$, over a line 117.

The display section 3 numerically displays the predicted temperature $T_p$, which is calculated successively with the passage of time.

FIRST EMBODIMENT

In accordance with a first embodiment of an electronic clinical thermometer of the invention, regression analysis is performed based on a plurality of predictive functional formulae in which sensed temperature data T serve as purposive variables and functions of time data t correlated with these sensed temperature data serve as explicative variables, thereby setting the values of the undetermined coefficient parameters of these predictive functional formulae.

Construction

Figure 2A:
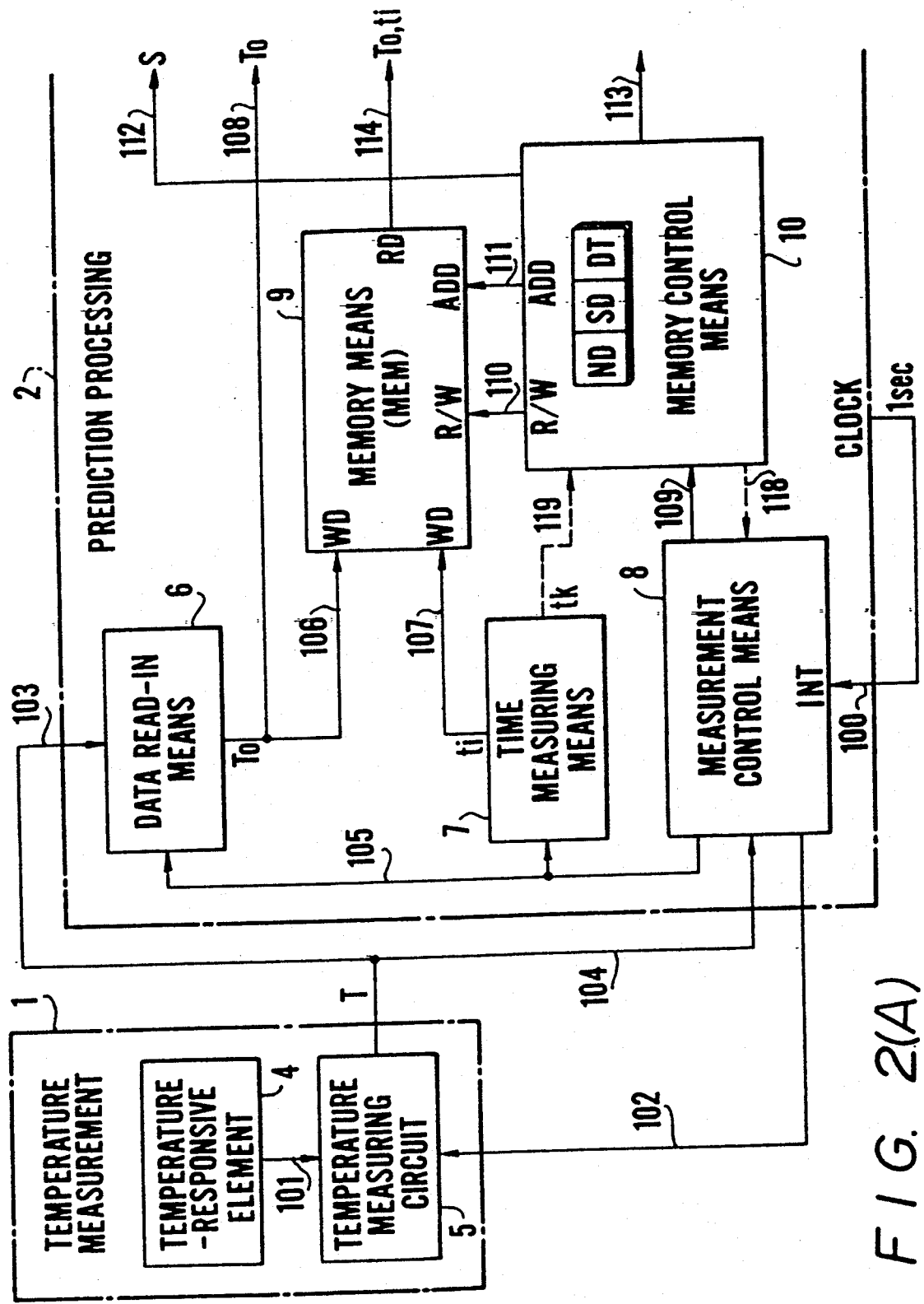

FIGS. 2(A) and 2(B) are a block diagram showing the construction of the electronic clinical thermometer of the first embodiment in greater detail.

As shown in FIGS. 2(A) and 2(B), the temperature measurement section 1 includes a temperature-responsive element 4 such as a thermister, and a temperature measuring circuit 5. In accordance with a data sampling command having a predetermined period received from the Prediction processing section 2 via a line 102, the temperature measuring circuit 5 samples an analog electric signal 101, which conforms to the temperature sensed by the element 4, and converts the signal into a digital signal which is then outputted in real time on lines 103, 104 as temperature data T.

The prediction processing section 2 includes data read-in means 6, time measuring means 7, measurement control means 8, memory means (MEM) 9, memory control means 10, data analyzing means 11, prediction arithmetic means 12, and a data selector 13. It should be noted that the functional blocks 6 through 13 shown in FIGS. 2(A) and 2(B) can be implemented by having a microcomputer (CPU) execute the programs shown in FIGS. 3(A) and 3(B), which are stored in a memory (ROM or RAM), not shown.

The measurement control means 8 controls the overall operation of the electronic clinical thermometer. Prior to the start of temperature measurement, the measurement control means 8 causes the temperature measuring circuit 5 to generate the temperature data T at a rate, e.g. of once per five seconds, monitors the temperature data constantly via line 104, and determines whether predetermined measurement starting conditions have been satisfied. For example, this means determining whether the data T represent a temperature higher than a certain temperature value, and whether the amount of temperature change is greater than a certain value. When these conditions are satisfied, the control means 8 activates such functional blocks as the data read-in means 6, time measuring means 7 and memory control means 10 via lines 105 and 109, whereby measurement is started. After measurement starts, the control means 8 receives, via a line 100, a clock signal CLOCK having a period, e.g. of 1 sec, generated by the prediction processing section 2. The various blocks operate in accordance with timer interrupt processing provided so as to respond to the clock signal.

The time measuring means 7 outputs elapsed time $t_i$ from the start of temperature measurement via line 107. After temperature measurement starts, the time measuring means 7 counts up the 1 sec signal outputted by the measurement control means via line 105, thereby keeping track of elapsed time from the start of temperature measurement.

The data read-in means 6 reads the sensed temperature data T on line 103 into the prediction processing section 2 in response to a one-second sampling signal received from the measurement control means 8 via line 105. The data read-in means 6 is capable of accumulating several items of successive temperature data while updating the same in FIFO (first-in first-out) fashion. The data read-in means 6 has an output terminal from which it is possible to obtain a running average value $T_0$ of the several items of sensed temperature data. If such an arrangement is adopted, the sensed temperature data $T_0$ will become stable.

The memory means 9 successively correlates and stores the items of sensed temperature data $T_0$ from the data read-in means 6 and the items of elapsed measurement time $t_i$ clocked by the time measuring means 7 at the respective instants the temperature is sensed.

Figure 4A:
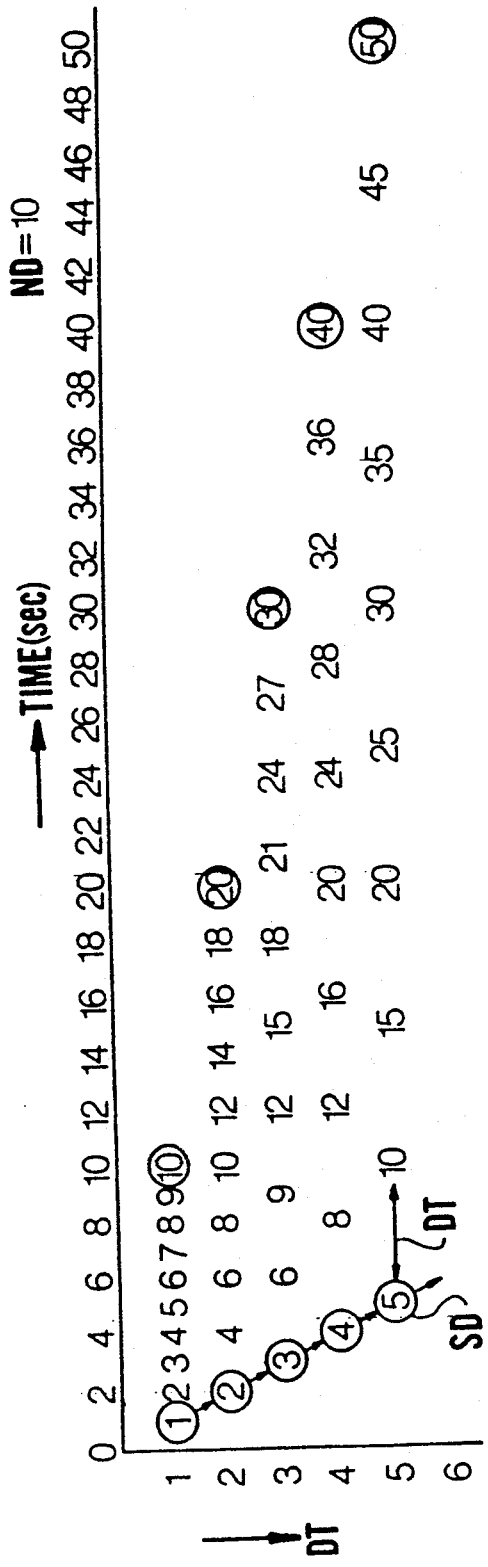
FIGS. 4(A) and 4(B) are views showing the manner in which data are written into and read out of memory means in the first embodiment.
Figure 4B:
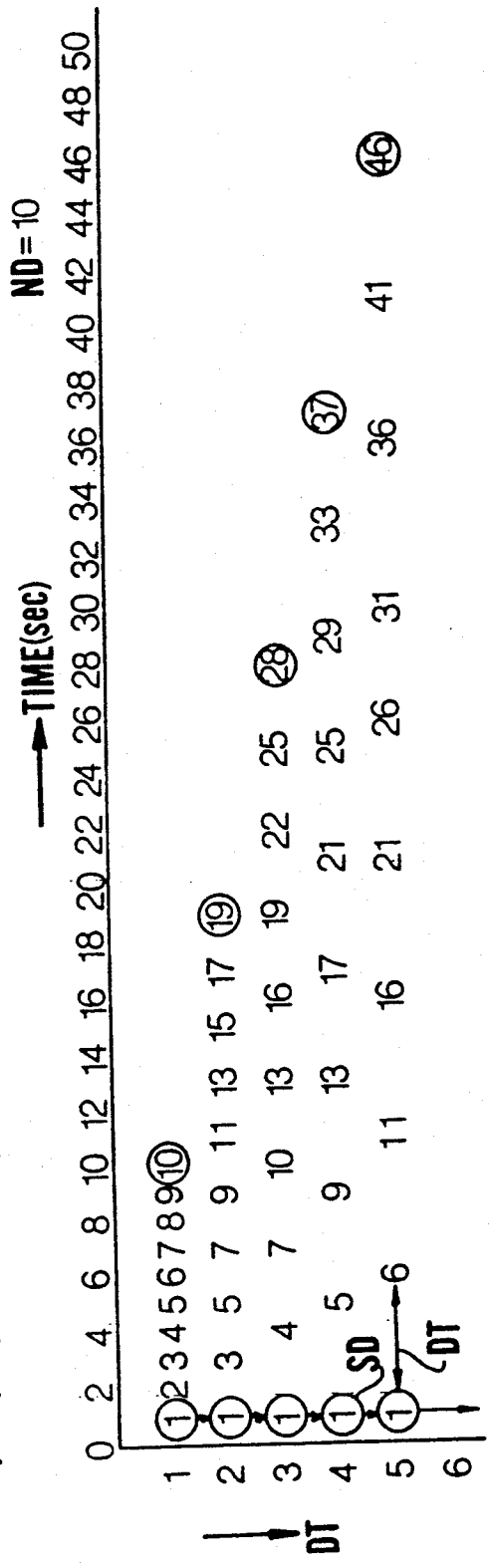

The memory control means 10 controls the writing of data into the memory means 9. In addition, as measurement proceeds, the memory control means 10 successively extracts the number of items of temperature data and time data necessary for the data analyzing means 11 to perform data analysis and provides the data analyzing means 11 with these data. The memory control means 10 includes a counter ND for writing the prescribed number of items of data into the memory means 9 and for reading the prescribed number of items of data out of the memory means 9, a counter SD for recording the address of the data to be read out of the memory means 9 initially, and a register DT for recording the time interval (address interval) of a series of data to be extracted from the memory means 9. FIGS. 4(A) and 4(B) are views showing the manner in which data are written into and read out of the memory means 9 by the memory control means 10 in the first embodiment. In FIG. 4(A), TIME along the horizontal axis indicates elapsed measurement time $t_i$ (in seconds). The sensed temperature data $T_0(t_i)$ are stored in a manner correlated with the time data $t_i$ prevailing at each instant the temperature is sensed. If the memory means 9 successively stores the sensed temperature data $T_0(t_i)$ having the period of one second after the start of measurement, as in the present embodiment, then the data can be stored in such a manner that the elapsed measurement time $t_i$ along the horizontal axis is substituted for the addresses ADD of the memory means 9. This will make it possible to delete a storage area for the time data $t_i$ per se. Thus, the temperature data $T_0(t_1) \sim T_0(t_{10})$ are stored from address ADD1 to address ADD10 in the initial ten seconds, and the temperature data $T_0(t_{11}) \sim T_0(t_{20})$ are stored from address ADD11 to address ADD20 in the next ten seconds. The sensed temperature data $T_0(t_i)$ are thus correlated with the time data $t_i$ that prevail at the instants the temperature is sensed. Of course, it is possible to store the sensed temperature data $T_0(t_i)$ and the time data $t_i$ at the sensing instants in pairs.

On the assumption that ten sets of data are required each time in order for the data analyzing means 11 to analyze the temperature rise curve, the memory control means 10 will supply the data analyzing means 10 with the temperature data $T_0(t_1)$ through $T_0(t_{10})$ from address ADD1 to address ADD10 at the moment the initial ten seconds elapse. The vertical axis DT in FIG. 4(A) indicates the time interval (read-out interval) DT of the data employed in each read-out cycle. In the first read-out cycle, the register DT records the contents of a one-second time interval. At this time the initial read-out address SD also holds the contents of the first second. At the moment the next ten seconds elapse, the memory control means 10 makes the contents of SD and DT two and extracts and provides the temperature data $T_0(t_2)$ of address ADD2, the temperature data $T_0(t_4)$ of address ADD4, the temperature data $T_0(t_6)$ of address ADD6, ..., and the temperature data $T_0(t_{20})$ of address ADD20. By adopting such an arrangement, a temperature rise curve can be analyzed over a longer range (e.g., 10 sec, 20 sec, 30 sec) even for a limited number (e.g. ten) of items of temperature data as measurement proceeds. This also facilitates memory control. The contents of the counter SD and register DT continue to increase in the manner shown in FIG. 4(A).

FIG. 4(B) shows a case where the count in counter SD is fixed to the first second. FIG. 4(B) is similar to FIG. 4(A) in other aspects. By adopting this arrangement, the first second of data are the object of analysis at all times. It is easy to expand this approach to reading methods of a variety of types.

Since the sensed temperature data $T_0(t_i)$ are obtained at a predetermined period, it will not be necessary to correlate the sensed temperature data $T_0(t_i)$ of every sampling with the time data $t_i$ at every temperature sensing moment if each item of sensed temperature data $T_0(t_i)$ is stored in a predetermined sequence in the order of generation. By way of example, if the memory control means 10 is capable of effecting the read out of time data $t_k$ of the time measuring means 7 via line 118 and the measurement control means 8 and of fetching these data via the line 119 when k items of sensed temperature data $T_0(t_k)$ have been stored, then all of the sensed temperature data $T_0(t_i)$ which preceed the above-mentioned sensed temperature data $T_0(t_k)$ will be correlated with the time data $t_i$ determined by the calculation $t_i = i \times t_k/k$ (where $i = 1 \sim k-1$).

The data analyzing means 11 is for setting the values of undetermined coefficient parameters of internally incorporated predictive functional formulae on the basis of the prescribed number of items of temperature data and corresponding time data read out at each read-out cycle. Specifically, when the memory control means 10 reads out each N items of temperature data $T_0(t_i)$ and time data $t_i$, the data analyzing means 11 determines the values of the coefficient parameters (regression coefficients) $A_0, A_1, A_2, \ldots, A_n$ by performing regression analysis based on the equation:

$$T_0(t_i) = A_0 + A_1/t_i + A_2/t_i^2 + A_3/t_i^3 + \ldots + A_n/t_i^n$$

$(i = 1 \sim N)$ in which the above-mentioned read temperature data $T_0(t_i)$ serve as purposive variables and functions $1/t_i, 1/t_i^2, 1/t_i^3, \ldots 1/t_i^n$ of the time data $t_i$ serve as explicative variables. Thus, the values of the coefficient parameters $A_0 \sim A_n$ of predictive functional formulae which reflect a sensed temperature curve are decided every read-out cycle so that a predictive functional formula for every read-out cycle can be specified.

The prediction arithmetic means 12 uses the predictive functional formula specified by the data analyzing means 11 to calculate a sensed temperature value which will prevail in the future, preferably at any desired future time. In accordance with the values of the coefficient parameters $A_0 \sim A_n$ decided by the data analyzing means 11, the temperature $T_p(t_c)$ which will prevail at a future time $t_c$ is calculated by using the following equation:

$$T_p(t_c) = A_0 + A_1/t_c + A_2/t_c^2 + A_3/t_c^3 + \ldots + A_n/t_c^n$$

This item of predicted temperature data $T_p(t_c)$ is outputted over a line 116.

Upon passage of a period of time so long that continuing predictive calculations would be meaningless, the data selector 13, which comprises switching means, terminates the early display based on the predicted temperature $T_p$ and switches over to a direct display based on the actually measured temperature data $T_0$. Since the data selector 13 is so connected as to pass the data on the side of the prediction arithmetic means 12 until it is judged that predetermined prediction terminating conditions are satisfied after the start of measurement, the display section 3 displays the predicted temperature $T_p(t_c)$.

Theoretical Description of Temperature Prediction

The principle of operation for predicting temperature in accordance with the invention will now be described.

By performing a theoretical analysis of heat conduction in a body temperature measurement system, the inventor has estimated the shape of a temperature rise curve of a temperature probe when body temperature is measured. Specifically, the analytical method entails using a model of a body temperature measurement system of the type shown in FIG. 5. By way of example, the model divides the measurement system into three regions, namely a probe region, skin region and subcutaneous tissue region, and assumes that the temperature distribution of each region is uniform in the body temperature measurement process. In other words, each region is treated conceptually as being of an infinitesimal volume. With regard to the subcutaneous tissue region, however, the thermal capacity is assumed to be infinity it should be noted that the terms "skin" and "subcutaneous tissue" are used for the sake of convenience since the living body is assumed to be a two-layer model; these do not strictly correspond to the actual structure of a living body. Furthermore, by dividing the system into a greater number of parts in accordance with future developments, it will be possible to improve the model to more closely resemble a living body if this is necessary.

Figure 5:
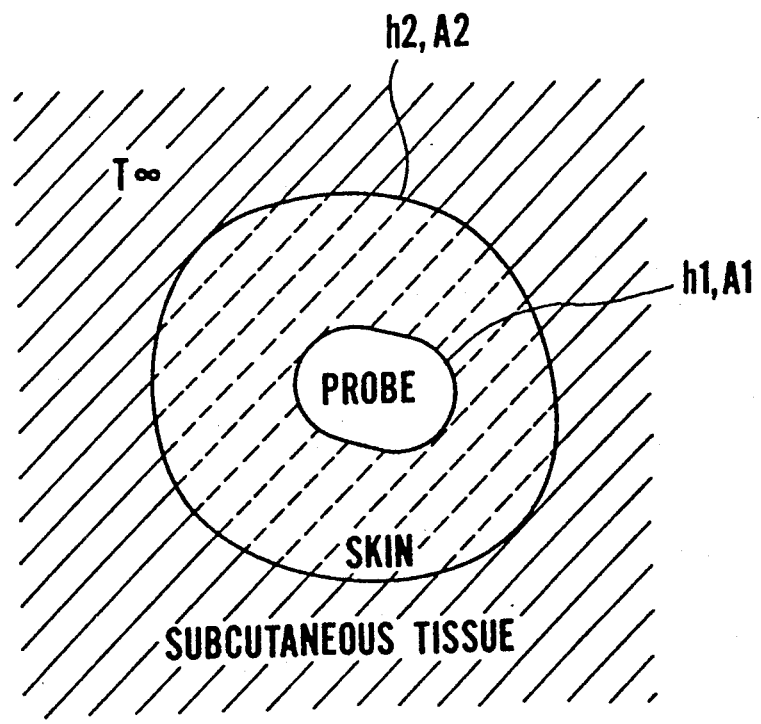
FIG. 5 is a conceptual view showing a heat conduction model of a body temperature measurement system.

In the measurement system model of FIG. 5, let $h_1$ represent the thermal conductivity between the probe and skin, $A_1$ the area of the interface, $h_2$ the thermal conductivity between the skin and subcutaneous tissue, and $A_2$ the area of the interface. Further, on the assumption that the thermal capacity of the subcutaneous tissue is infinity, the temperature of the subcutaneous tissue will be a constant value $T_{sat}$ with respect to time. Thus, the amount of heat absorbed by the probe from the skin after the probe is brought into contact with a part of the living body at which temperature is to be measured is equal to an amount of increase in the internal energy of the probe. Therefore, the following equation holds:

$$h_1 A_1 (T_s - T_p) = \rho_p C_p V_p \frac{dT_p}{dt} \qquad (1)$$

Similarly, the amount of heat absorbed by the skin from the subcutaneous tissue and the probe is equal to an amount of increase in the internal energy of the skin. Therefore, the following equation holds:

$$h_1 A_1 (T_p - T_s) + h_2 A_2 (T_{sat} - T_s) = \rho_s C_s V_s \frac{dT_s}{dt} \qquad (2)$$

where
$T_p$, $\rho_p$, $C_p$, $V_p$: temperature, density, specific heat and volume of probe
$T_s$, $\rho_s$, $C_s$, $V_s$: temperature, density, specific heat and volume of skin
$T_{sat}\{=T_p(\infty)\}$: subcutaneous tissue temperature = equilibrium temperature If the simultaneous linear differential equations comprising equations (1) and (2) are solved, then the following equation is obtained:

$$\frac{d^2 T_p}{dt^2} + (K_1 - K_2 + K_3) \frac{dT_p}{dt} + K_1 K_3 T_p = K_1 K_3 T_{sat} \qquad (3)$$

where $$K_1 = \frac{h_1 A_1}{\rho_p C_p V_p}$$

$$K_2 = \frac{h_1 A_1}{\rho_s C_s V_s}$$

$$K_3 = \frac{h_2 A_2}{\rho_s C_s V_s}$$

Since equation (3) is a higher order linear differential equation, it can be solved using a Laplace transformation. That is, using $$f \frac{d^2 T_p}{dt^2} + (K_1 - K_2 + K_3) f \frac{dT_p}{dt} + K_1 K_3 f T_p =$$

$$K_1 K_3 f T_{sat}$$

and calculating each term, one has $$f \frac{d^2 T_p}{dt^2} = -C_1 - C_o s + s^2 f T_p$$

$$f \frac{dT_p}{dt} = -C_o + s f T_p$$

where $$C_o = T_p(0) \quad C_1 = \frac{dT_p}{dt} \bigg|_{t=0}$$

Solving the above for $fT_p$, we obtain $$fT_p \frac{1}{s^2 + (K_1 - K_2 + K_3) s + K_1 K_3} \times \qquad (4)$$

$$\left( C_1 + (K_1 - K_2 + K_3) C_o + s C_o + \frac{K_1 K_3}{s} T_{sat} \right)$$

Using the solution $s^2 + (K_1 - K_2 + K_3)s + K_1 K_3 = 0$ for $m_1$, $m_2$, we have $$m_1 = \frac{1}{2} \{ -(K_1 - K_2 + K_3) + \sqrt{(K_1 - K_2 + K_3)^2 - 4K_1 K_3} \}$$

$$m_2 = \frac{1}{2} \{ -(K_1 - K_2 + K_3) - \sqrt{(K_1 - K_2 + K_3)^2 - 4K_1 K_3} \}$$

When $m_1 \neq m_2$ holds, one has the following from equation (4):

$$fT_p = \frac{1}{s - m_1} \frac{1}{m_1 - m_2} \times$$

$$\{C_1 + (K_1 - K_2 + K_3) C_o + m_1 C_o + m_2 T_{sat}\} -$$

$$\frac{1}{s - m_2} \frac{1}{m_1 - m_2} \times$$

-continued $$\{C_1 + (K_1 - K_2 + K_3) C_0 + m_2C_0 + m_1T_{sat}\} + \frac{T_{sat}}{s}$$

Since it is known that $fe^{kx}=1/(s-K)$, an equation involving $T_p(t)$ is obtained as follows:

$$T_p(t) = T_{sat} + M_1 e^{m_1 t} + M_2 e^{m_2 t} \quad (5)$$

where $$M_1 = \frac{1}{m_1 - m_2} \{C_1 + (K_1 - K_2 + K_3) C_0 + m_1C_0 + m_2T_{sat}\}$$

$$M_2 = \frac{-1}{m_1 - m_2} \{C_1 + (K_1 - K_2 + K_3) C_0 + m_2C_0 + m_1T_{sat}\}$$

When $m_1 = m_2$ holds, one has the following from equation (4):

$$fT_p = \frac{1}{(s - m_1)^2} \{C_1 + (K_1 - K_2 + K_3) C_0 + m_1C_0 + 3m_1T_{sat}\} +$$

$$\frac{1}{s - m_1} (C_0 - T_{sat}) + \frac{T_{sat}}{s} \quad (\because K_1 K_3 = m_1^2)$$

Since it is known that $fe^{kx}=1/(s-K)$, $fX \cdot e^{kx}=1/(s-K)^2$, an equation involving $T_p(t)$ is obtained as follows:

$$T_p(t) = T_{sat} + M_3 e^{m_1 t} + M_4 t e^{m_1 t} \quad (6)$$

where
$M_3 = C_0 - T_{sat}$
$M_4 = C_1 - m_1C_0 + 3m_1T_{sat}$

Thus, theoretical equations representing the temperature rise curve of a probe are thus given by equations (5) and (6).

In equations (5) and (6), $m_1$, $m_2$ and $M_1 \sim M_4$ are given as functions of various physical quantities contained in a body temperature measurement system including physical values (density, specific heat, volume, etc.) of the probe and skin, and these values vary from one thermometer to another and with every temperature measurement. Accordingly, it is required that $m_1$, $m_2$, $M_1 \sim M_4$ be set on the basis of the temperature data sensed by the probe when a measurement is taken.

Electronic clinical thermometers include those of the type in which after the probe is brought into contact with the part of the body to be measured, the temperature data do not begin to be read until the probe senses a predetermined temperature. For electronic clinical thermometers such as these, it is convenient to transform equations (5) and (6) into the following equations:

$$T_p(t) = T_{sat} + P e^{m_1 t} + Q e^{m_2 t} \quad (7)$$

$$T_p(t) = T_{sat} + R e^{m_1 t} + S t e^{m_1 t} \quad (8)$$

where
$P = M_1 e^{m_1 \cdot \Delta t}$
$Q = M_2 e^{m_2 \cdot \Delta t}$
$R = M_3 e^{m_1 \cdot \Delta t} + M_4 \Delta t e^{m_1 \cdot \Delta t}$
$S = M_4 e^{m_1 \cdot \Delta t}$ In the above, $\Delta t$ represents elapsed time from the moment the probe is contacted with the body until the start of measurement, and t represents time where measurement starting time is taken as being $t = 0$.

If $m_1$, $m_2$ are taken as being fixed values in equations (7), then $T_{sat}$, P, and Q can be obtained with relative ease by regression analysis or by solving the simultaneous equations using temperature data sensed in a time series when a measurement is taken. However, $m_1$, $m_2$ vary with each measurement due to differences in the individual undergoing measurement or a difference in measurement conditions. Moreover, the object of the present invention is to find the optimum prediction function by incorporating all of these variable elements every time a measurement is taken, thereby performing a temperature prediction having a high degree of universality. Though it is mathematically possible to obtain $m_1$, $m_2$, $T_{sat}$, P, and Q by solving the simultaneous equation (7) using temperature data sensed when a measurement is taken, the results would be highly unstable due to the combined effect of: (1) the fact that a noise component is contained in the sensed temperature data and (2) the fact that equation (7) includes exponential terms.

Accordingly, the following equation is obtained by subjecting equation (7) to a Taylor expansion:

$$\begin{aligned} T_p(t) &= A_0 + A_1/t + A_2/t^2 + A_3/t^3 + \ldots + A_i/t^i + \ldots \\ &= T_{sat} + A_1/t + A_2/t^2 + A_3/t^3 + \ldots + A_i/t^i + \ldots \\ &\quad \{\because T_p(\infty) = T_{sat}\} \end{aligned} \quad (9)$$

Deleting terms of the fourth degree onward gives the following equation:

$$T_p(t) = A_0 + A_1/t + A_2/t^2 + A_3/t^3 \quad (10)$$

The foregoing will also hold in a similar manner for equation (8).

Next, in accordance with equation (10), temperature data sensed in a time series and the time data at each sensing instant are used to perform regression analysis based on the equation:

$$T_0(t_i) = A_0 + A_1/t_i + A_2/t_i^2 + A_3/t_i^3 \quad (i = 1 \sim N)$$

in which N items of temperature data $T_0(t_i)$ serve as purposive variables and functions $1/t_i$, $1/t_i^2$, $1/t_i^3$ of time data $t_i$ serve as explicative variables, whereby the values of the coefficient parameters (regression coefficients) of the predictive functional formulae can be decided.

An exemplary method of determining the values of the coefficient parameters $A_0 \sim A_3$ by regression analysis will now be described.

Letting $T_0(t_i)$ be a purposive variable, $1/t_i$, $1/t_i^2$, $1/t_i^3$ the explicative variables and $i = 1 \sim 10$, $$T_0(t_i) = A_0 + A_1/t_i A_2/t_i^2 + A_3/t_i^3$$

will be expressed by the following equation:

$$y_i = A_0 + A_1 x_{1i} + A_2 x_{2i} + A_3 x_{3i}$$

A variance and covariance matrix of $x_1 \sim x_3$ is expressed by $$\begin{bmatrix} S_{11} & S_{12} & S_{13} \\ S_{21} & S_{22} & S_{23} \\ S_{31} & S_{32} & S_{33} \end{bmatrix}$$

assuming that $$S_{kl} = \frac{1}{10} \sum_{i=1}^{10} (x_{ki} - \overline{x_k}) \cdot (x_{li} - \overline{x_l})$$

A covariance matrix of y and $x_1 \sim x_3$ is expressed by $$\begin{bmatrix} S_1 \\ S_2 \\ S_3 \end{bmatrix}$$

assuming that $$S_k = \frac{1}{10} \sum_{i=1}^{10} y_i \cdot x_{ki} - \overline{y} \cdot \overline{x_k}$$

$A_1$, $A_2$, $A_3$ are determined by solving the following simultaneous equations:

$$\begin{bmatrix} S_{11} & S_{12} & S_{13} \\ S_{21} & S_{22} & S_{23} \\ S_{31} & S_{32} & S_{33} \end{bmatrix} \begin{bmatrix} A_1 \\ A_2 \\ A_3 \end{bmatrix} = \begin{bmatrix} S_1 \\ S_2 \\ S_3 \end{bmatrix}$$

A sweep-out method or the like can be used in the calculation of these simultaneous equations.

Next, $A_0$ is determined from the following equation:

$$A_0 = \overline{y} - (A_1 \overline{x}_1 + A_2 \overline{x}_2 + A_3 \overline{x}_3)$$

Thus, the preceding temperature data cover all physical conditions. The values of the coefficient parameters of the predictive functional formulae are decided on the basis of the correlation between these temperature data and time data, and the optimum prediction function is specified.

Accordingly, sensed temperature which will prevail at a future time $t_c$ is calculated in accordance with the following equation using the specified prediction function:

$$T_p(t_c) = A_0 + A_1/t_c + A_2/t_c^2 + A_3/t_c^3$$

Thus, in accordance with the invention as set forth above, first the temperature data are stored, the values of the coefficient parameters of a predictive functional formula based on these temperature data are determined, prediction processing is performed for calculating temperature at a future time in accordance with the predictive functional formula that has been decided, and the predicted temperature $T_p$ that has been calculated is displayed. This cycle is repeated to obtain an early display of body temperature which is universal and which attains the equilibrium temperature quickly and smoothly.

Operation

Figure 3A:
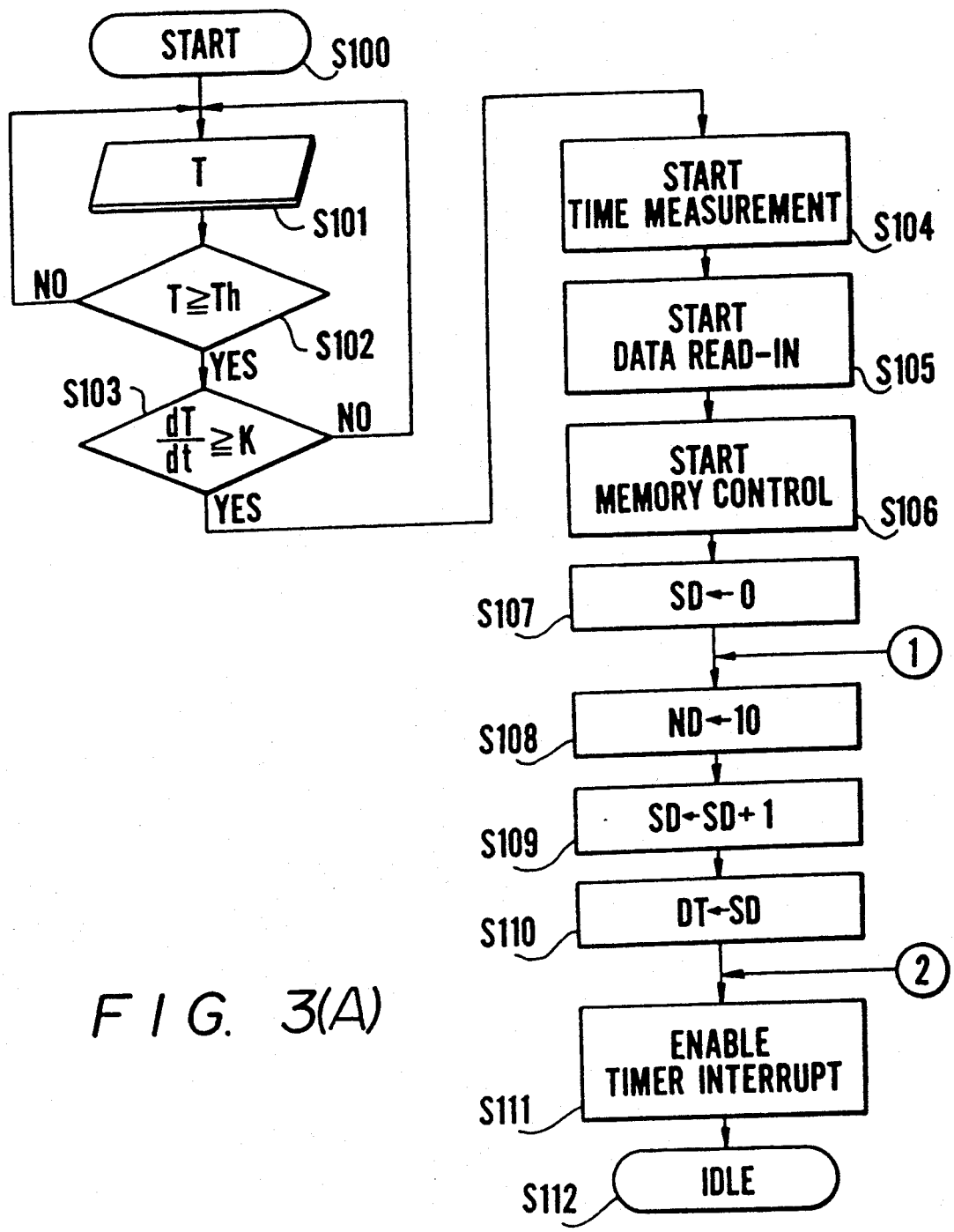
FIGS. 3(A) and 3(B) are flowcharts showing temperature sensing processing executed in the first embodiment of the electronic clinical thermometer.
Figure 3B:
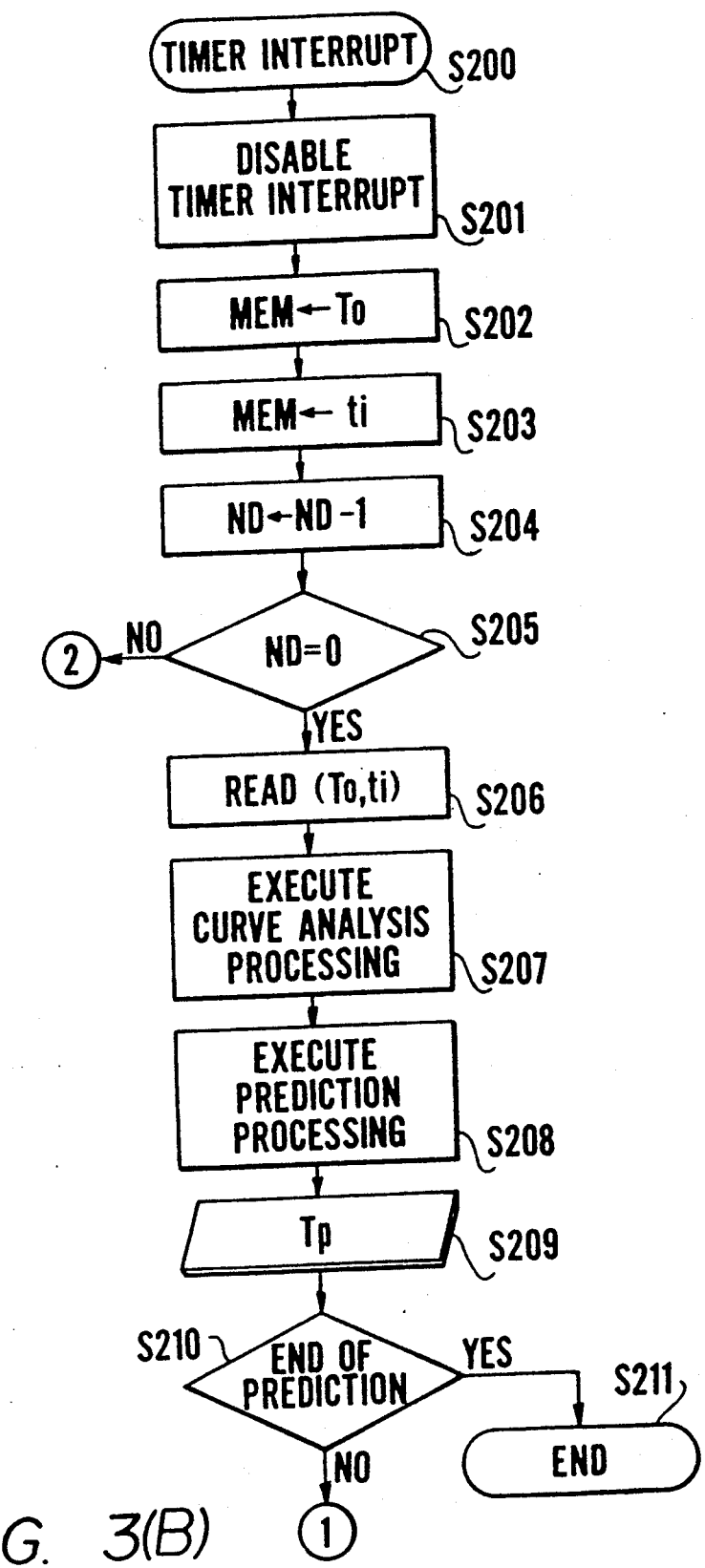

FIGS. 3(A) and 3(B) are flowcharts showing temperature sensing processing executed in the first embodiment of the electronic clinical thermometer. In FIG. 3(A), the first step of the flowchart is a start step S100 at which electric power is supplied to the electronic clinical thermometer. This is followed by a temperature measurement step S101, at which the temperature measurement section 1 and measurement control means 8 operate. Specifically, the measurement control means 8 causes the temperature measuring circuit 5 to sense temperature at a rate, e.g. once per five seconds, and monitors the sensed temperature data T. Next, decision steps S102, S103 call for a decision as to whether body temperature measurement should start. It is determined at the step S102 whether the sensed temperature has exceeded a predetermined temperature $T_h$, e.g. 30° C., and it is determined at the step S103 whether the rate of temperature rise is no less than 0.1° C. per second. If the conditions of steps S102, S103 are satisfied, the program proceeds to a step S104, at which the time measuring means is cleared and started via line 105. In other words, a time measuring counter in the time measuring means 7 is reset and clocking of elapsed measurement time is started. The data read-in function of the data read-in means 6 is activated via line 105 at a step S105, and the data write/read function of the memory control means 10 is activated via line 109 at a step S106.

Preprocessing for reading and writing of data with respect to the memory means 9 is performed through steps S107-S110. Specifically, the counter SD is cleared at step S107, and the counter ND is set to 10 at step S108. The count in counter SD is incremented at step S109, and the count in counter SD is set in the register DT at step S110. A timer interrupt at a rate of once per second is enabled at a step S111, and the CPU executes an idle routine at a step S112 to await the occurrence of the timer interrupt.

In FIG. 3(B), the program enters step S200 when a timer interrupt is generated. The timer interrupt is disabled at step S201. This is followed by a step S202, at which the temperature data $T_0$ read in by the data read-in means 6 are written in the memory means 9, and by a step S203, at which the elapsed measurement time data $t_i$ generated by the time measuring means 7 at the corresponding temperature sensing instants are stored in the memory means 9. The count in counter ND is decremented at a step S204, after which it is determined at a step S205 whether the count in counter ND is zero. If the count is not zero, then the program returns to step S111 to await the next timer interrupt. Thus, the temperature data $T_0$ and the elasped measurement time data $t_i$ which prevail at the temperature sensing instants are successively stored in memory means 9 in correlated fashion.

When the count in counter ND eventually becomes zero, ten items of data will have been accumulated, so that the program will proceed to step S206, at which the temperature data $T_0$ and each item of elapsed measurement time data $t_i$ accumulated in the memory means 9 are read out to the data analyzing means 11 by the memory control means 10. In this case, the ten sets of data initially read out by the memory control means 10 are temperature data $T_0(t_1)$ and time data $t_1$ (=one second), temperature data $T_0(t_2)$ and time data $t_2$ (=two seconds), . . . , and temperature data $T_0(t_{10})$ and time data $t_{10}$ (=ten seconds). This is followed by a step S207, at which the data analyzing means 11 creates the following table on the basis of these data:

$$[T_0(t_1), 1/t_1, 1/t_1^2, 1/t_1^3]$$
$$[T_0(t_2), 1/t_2, 1/t_2^2, 1/t_2^3]$$
$$\ldots$$
$$[T_0(t_{10}), 1/t_{10}, 1/t_{10}^2, 1/t_{10}^3]$$

The data analyzing means 11 also performs regression analysis in accordance with the following equation, in which the temperature data $T_0(t_i)$ serve as purposive variables and the functions $1/t_i$, $1/t_i^2$, $1/t_i^3$ of time data $t_i$ correlated with these purposive variables serve as explicative variables:

$$T_0(t_i) = A_0 + A_1/t_i + A_2/t_i^2 + A_3/t_i^3$$

$(i = 1 \sim 10)$

Thus the values of the coefficient parameters (regression coefficients) $A_0 \sim A_3$ of the predictive functional formula are determined. Next, at a step S208, the values of the coefficient parameters $A_0 \sim A_3$ determined by the data analyzing means 11 are sent to the prediction processing means 12, which, in accordance with the following equation, determines the predicted temperature $T_p(t_c)$ that will prevail at the measured region of the living body at the future time $t_c$:

$$T_p(t_c) = A_0 + A_1/t_c + A_2/t_c^2 + A_3/t_c^3$$

Since the elapsed measurement time $t_c$ can be set at will in accordance with the invention, the value of sensed temperature that will prevail in the future upon elapse of any period of time can be predicted easily and accurately. That is, when the temperature that will prevail at thermal equilibrium is predicted, ideally $t_c$ is an infinite quantity. However, in consideration of ordinary temperature sensing practice, $t_c$ can be set to any prescribed value ranging from e.g. 300 to 600 seconds.

The predicted temperature $T_p$ which has been determined is digitally displayed on the display unit 3 at a step S209. It is then determined at a step S210 whether the predicting operation has ended. Examples of conceivable conditions which, when satisfied, mean that a prediction has ended are as follows: when the absolute value of the slope of a predicted temperature rise falls below a predetermined value, when the difference between predicted temperature and actual temperature falls below a predetermined value, and when so much measurement time has elapsed that continuing prediction processing would be meaningless.

When any of these conditions for deciding that the prediction has ended is not satisfied at step S210, the program returns to the step S108. If any of the aforementioned conditions is satisfied at step S210, the program proceeds to a step S211, at which processing is terminated. The value of the early display of predicted temperature $T_p$ is thus frozen.

Approximately 10 minutes after the start of measurement, the actually measured temperature generally will attain the equilibrium temperature regardless of the region being measured. Therefore, continuing the prediction for a time longer than this will have almost no effect on the predicted results. For this reason, rather than freezing the early display of predicted temperature as mentioned above, it is permissible after ten minutes to change over the data selector 13 of FIG. 2(B) to display the actually measured temperature $T_0$.

Figure 6:
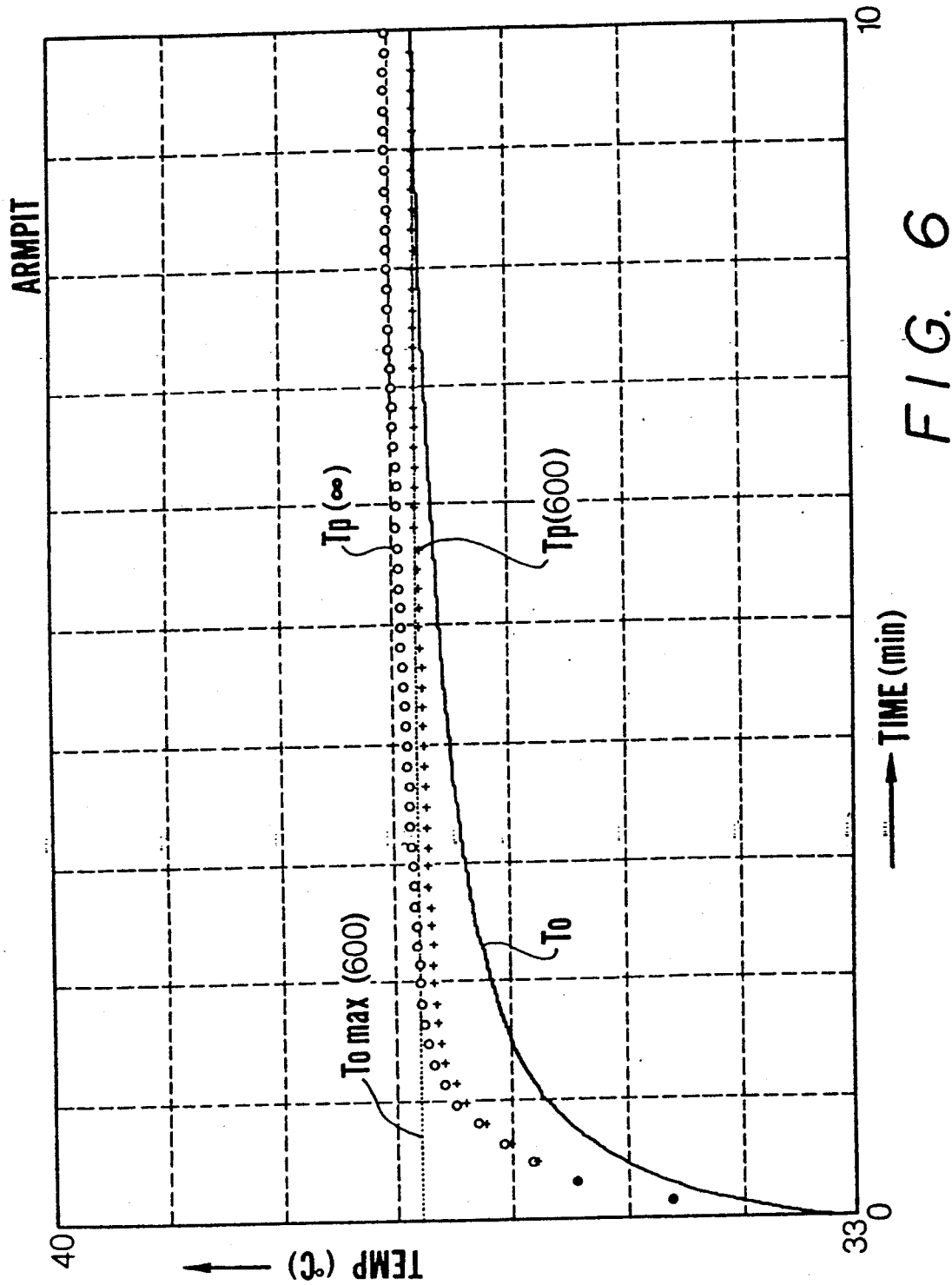
FIG. 6 is a graph showing the course of measurement when temperature is sensed in an armpit by the electronic clinical thermometer of the first embodiment.
Figure 7:
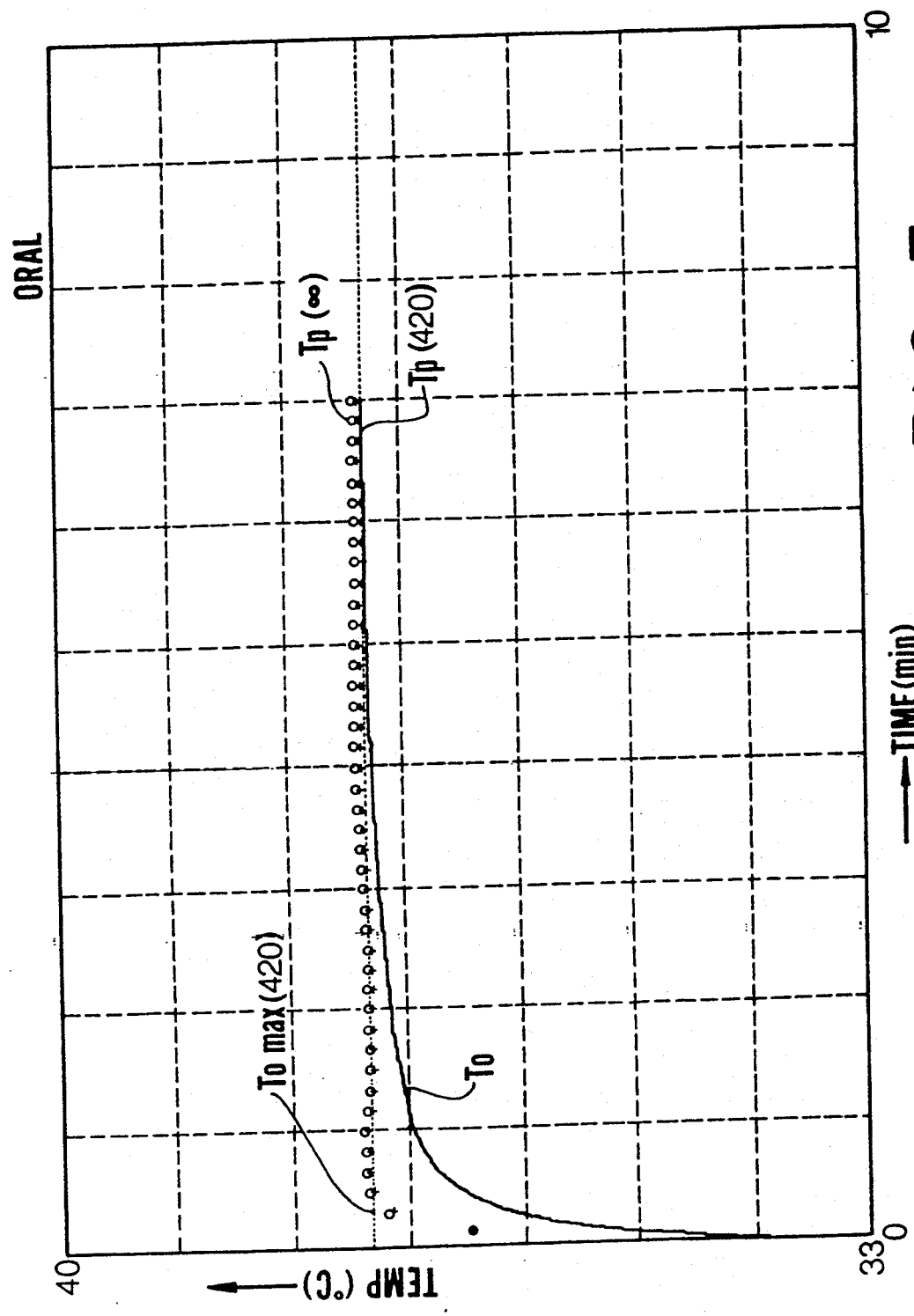
FIGS. 7 and 8 are graphs showing the course of measurement when temperature is sensed orally by the electronic clinical thermometer of the first embodiment.
Figure 8:
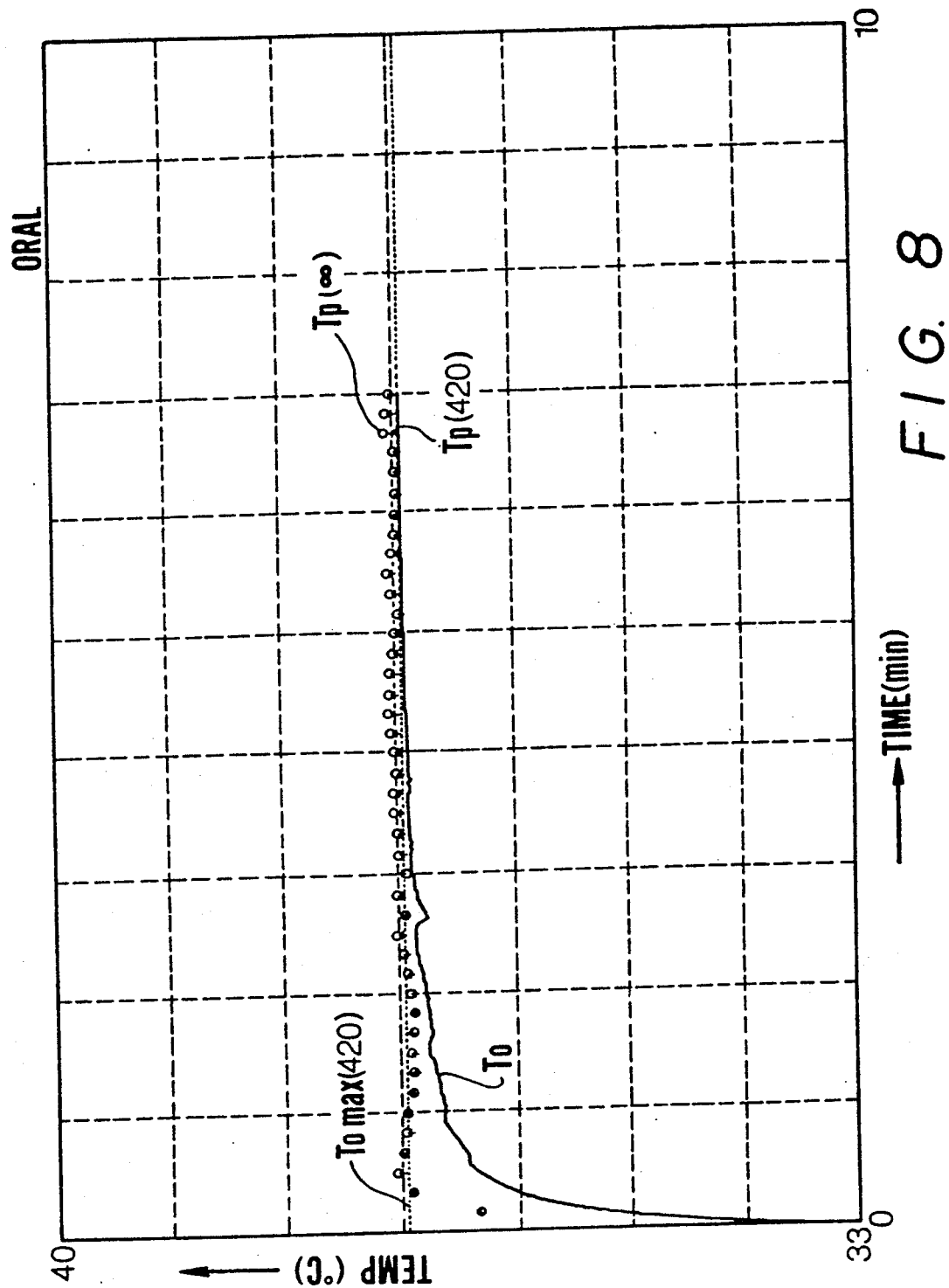

FIG. 6 is a graph showing the course of measurement when temperature is sensed in an armpit by the electronic clinical thermometer of the first embodiment. Similarly, FIGS. 7 and 8 are graphs showing the course of measurement when temperature is sensed orally by the electronic clinical thermometer. It will be understood from these graphs that the transitions of a predicted value $T_p(\infty)$ at thermal equilibrium, a predicted value $T_p(420)$ with regard to a sensed temperature value $T_{0max(420)}$ (420 seconds after the start of measurement), and a predicted value $T_p(600)$ with regard to a sensed temperature value $T_{0max(600)}$ 600 seconds after the start of measurement) all describe extremely stable rise curves with respect to the temperature data $T_0$ sensed in the armpit and orally. In general, a dispersion in thermal characteristics when the temperature probes are mass-produced has little effect upon the shape of a body temperature measurement curve in comparison with differences between the regions of the body (armpit, mouth, etc.) at which the temperature is sensed. Therefore, even if probes are changed, the transition of the predicted values will still describe a stable rise curve. Though the time required for a predicted value to indicate the sensed temperature value that will prevail at a future time is not necessarily shorter than that required with the conventional prediction system, instability which is frequent in the conventional prediction system, such as overshooting in the vicinity of the rising edge of the measurement curve or extreme fluctuations in the predicted value due to noise superimposed on the actually measured temperature curve, as shown in FIG. 8, is eliminated.

In accordance with the first embodiment of the invention as described above, the values of all coefficient parameters in the prediction formulae are calculated using real-time temperature data when a measurement is taken. This makes it possible to obtain an accurate, early display of temperature at all times even if temperature rise curves differ because of a dispersion in the thermal characteristics of the probe, individual differences or differences in the part of a body where temperature is sensed.

Further, in accordance with the first embodiment, since real-time temperature data per se are used as purposive variables, there is no adverse influence ascribable to calculation error, the values of the coefficient parameters can be decided stably, and predicted values do not fluctuate widely even when noise is superimposed on an actually measured temperature curve.

Moreover, in accordance with the first embodiment, temperature data are sampled in such a manner that all temperature rise curves at each moment of elapsed measurement time are covered. Accordingly, the transition of the predicted value describes a natural rise curve and there is no overshoot in the vicinity of temperature rise. This makes it possible for a measurement to be taken without the user being aware of the fact that a prediction is being made.

In accordance with the first embodiment, any future time can be set with regard to a prediction formula. Therefore, a sensed temperature value which prevails after any elapsed measurement time can be provided with ease. This also makes it possible to provide a predicted value of thermal equilibrium temperature which will prevail in the future after a very long elapsed time period.

SECOND EMBODIMENT

In accordance with a second embodiment of an electronic clinical thermometer of the invention, simultaneous equations constituted by a plurality of predictive functional formulae, in which sensed temperature data T serve as purposive variables and functions of time data t correlated with these sensed temperature data serve as explicative variables, are solved. This sets the values of the undetermined coefficient parameters of these predictive functional formulae.

Construction

Figure 9A:
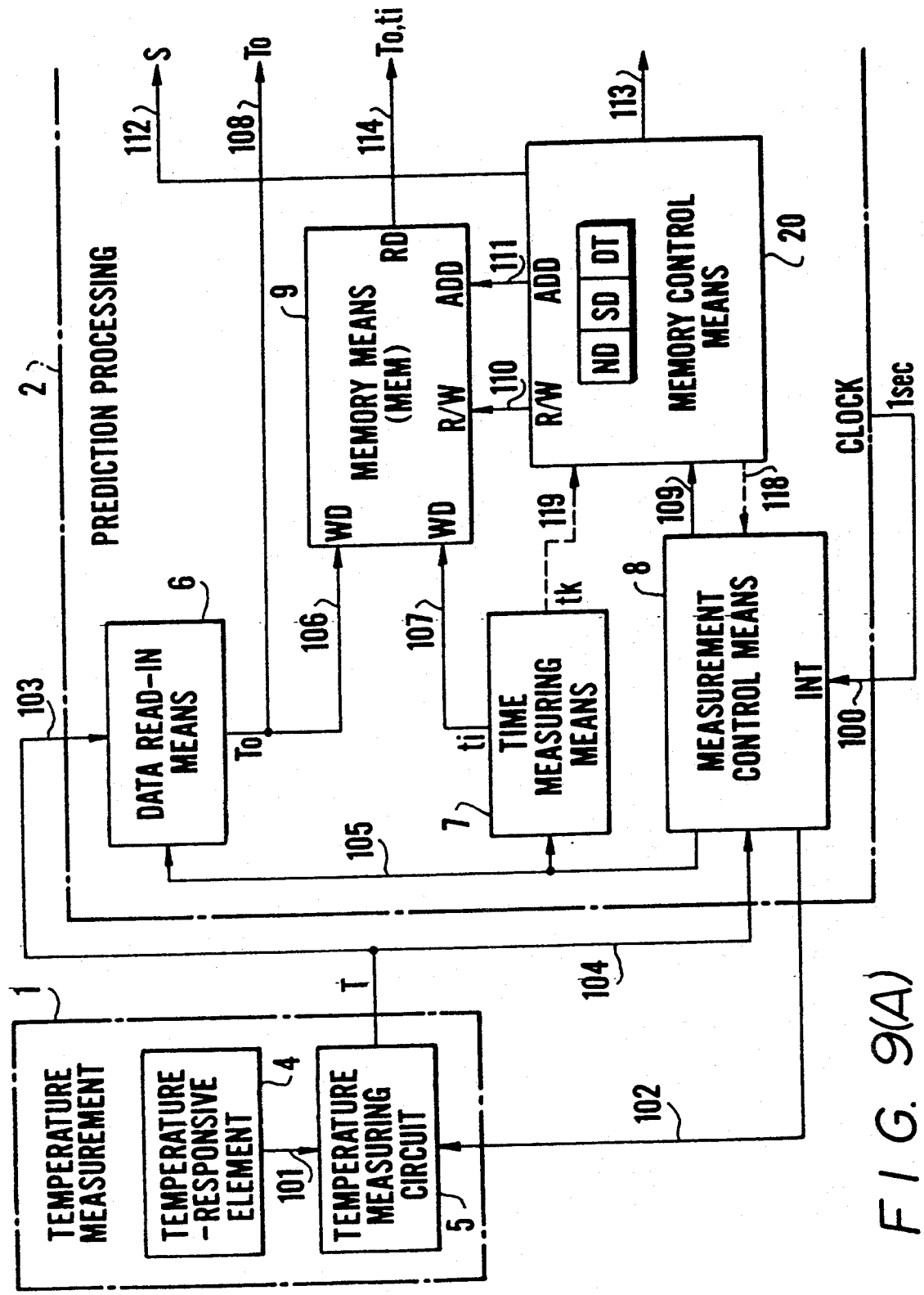
FIGS. 9(A) and 9(B) are a block diagram illustrating the specific construction of a second embodiment of the electronic clinical thermometer according to the invention.
Figure 9B:
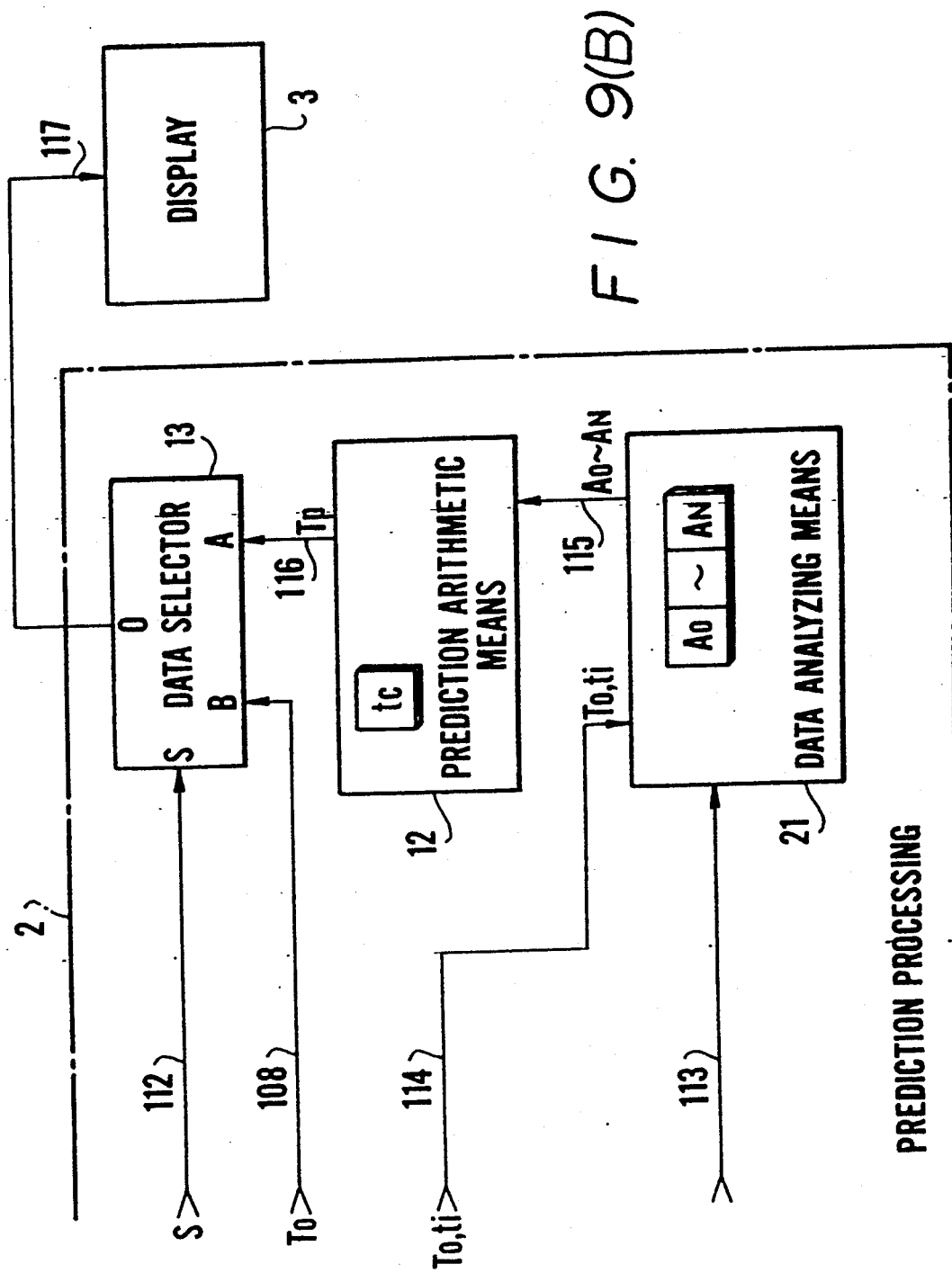

FIGS. 9(A) and 9(B) are a block diagram showing the construction of the electronic clinical thermometer of the second embodiment in greater detail. Portions identical with those shown in FIGS. 2(A) and 2(B) are designated by like reference characters and need not be described again. In FIG. 9(A), the memory control means 20 controls the writing of data into the memory means 9. In addition, as measurement proceeds, the memory control means 20 successively extracts the number of items of temperature data and time data necessary for data analyzing means 21 to perform data analysis and provides the data analyzing means )1 with these data. The memory control means 20 includes a counter ND for writing the prescribed number of items of data into the memory means 9 and for reading the prescribed number of items of data out of the memory means 9, a counter SD for recording the address of the data to be read out of the memory means 9 initially, and a register DT for recording the time interval (address interval) of a series of data to be extracted from the memory means 9.

FIGS. 11(A) and 11(B) are views showing the manner in which data are written into and read out of the memory means 9 by the memory control means 20 in the second embodiment. In FIG. 11(A), TIME along the horizontal axis indicates elapsed measurement time $t_i$ (in seconds). The sensed temperature data $T_0(t_i)$ are stored in a manner correlated with the time data $t_i$ prevailing at each instant the temperature is sensed. If the memory means 9 successively stores the sensed temperature data $T_0(t_i)$ having the period of one second after the start of measurement, as in the present embodiment, then the data can be stored in such a manner that the elapsed measurement time $t_i$ along the horizontal axis is substituted for the addresses ADD of the memory means 9. This will make it possible to delete a storage area for the time data $t_i$ per se. Thus, the temperature data $T_0(t_1) \sim T_0(t_4)$ are stored from address ADD1 to address ADD4 in the initial four seconds, and the temperature data $T_0(t_5) \sim T_0(t_8)$ are stored from address ADD5 to address ADD8 in the next four seconds. The sensed temperature data $T_0(t_i)$ are thus correlated with the time data $t_i$ that prevail at the instants the temperature is sensed. Of course, it is possible to store the sensed temperature data $T_0(t_i)$ and the time data ti at the sensing instants in pairs.

On the assumption that four sets of data are required each time in order for the data analyzing means 21 to analyze the temperature rise curve, the memory control means 20 will supply the data analyzing means 21 with the temperature data $T_0(t_1)$ through $T_0(t_4)$ from address ADD1 to address ADD4 at the moment the initial four seconds elapse. The vertical axis DT in FIG. 11(A) indicates the time interval (read-out interval) DT of the data employed in each read-out cycle. In the first read-out cycle, the register DT records the contents of a one-second time interval. At this time, SD also holds the contents of the first second. At the moment the next four seconds elapse, the memory control means 20 makes the contents of SD and DT two and extracts and provides the temperature data $T_0(t_2)$ of address ADD2, the temperature data $T_0(t_4)$ of address ADD4, the temperature data $T_0(t_6)$ of address ADD6, and the temperature data $T_0(t_8)$ of address ADD8. By adopting such an arrangement, a temperature rise curve can be analyzed over a longer range (e.g. 4 sec, 8 sec, 12 sec) even for a limited number (e.g. four) of items of temperature data as measurement proceeds. This also facilitates memory control. The contents of the counter SD and register DT continue to increase in the manner shown in FIG. 11(A).

FIG. 11(B) shows a case where the count in counter SD is fixed to the first second. FIG. 11(B) is similar to FIG. 11(A) in other aspects. By adopting this arrangement, the first second of data are the object of analysis at all times. It is easy to expand this approach to reading methods of a variety of types.

Since the sensed temperature data $T_0(t_i)$ are obtained at a predetermined period, it will not be necessary to correlate the sensed temperature data $T_0(t_1)$ of every sampling with the time data $t_i$ at every temperature sensing moment if each item of sensed temperature data $T_0(t_i)$ is stored in a predetermined sequence in the order of generation. By way of example, if the memory control means 20 is capable of effecting the read out of time data $t_k$ of the time measuring means 7 via line 118 and the measurement control means 8 and of fetching these data via the line 119 when k items of sensed temperature data $T_0(t_k)$ have been stored, then all of the sensed temperature data $T_0(t_i)$ which preceed the above-mentioned sensed temperature data $T_0(t_k)$ will be correlated with the time data $t_i$ determined by the calculation $t_i = i \times t_k/k$ (where $i = 1 \sim k-1$).

The data analyzing means 21 is for setting the values of undetermined coefficient parameters of internally incorporated predictive functional formulae on the basis of the prescribed number of items of temperature data and corresponding time data read out at each read-out cycle. Specifically, the data analyzing means 21 determines the values of the undetermined coefficient parameters $A_0, A_1, A_2, \ldots, A_N$ of the predictive functional formulae by solving the following simultaneous equation with $(N+1)$ unknowns on the basis of each of the $(N+1)$ items of temperature data $T_0(t_i)$ and time data $t_i$ read out by the memory control means 20:

$$T_0(t_i) = A_0 + A_1/t_i + A_2/t_i^2 + A_3/t_i^3 + \ldots + A_N/t_i^N$$

$(i = 0 \sim N)$

Thus, the values of the undetermined coefficient parameters $A_0 \sim A_N$ of the predictive functional formulae are decided, thereby making it possible to decide the immediate predictive functional formula. In the second embodiment of the invention, terms of the fourth degree onward in equation (9) are deleted to obtain equation (10), and the values of the coefficient parameters $A_0 \sim A_3$ of the prediction functional formulae are decided by solving the following simultaneous equation with four unknowns on the basis of e.g. four items of temperature data $T_0(t_i)$ and time data $t_i$. Thus, the preceding temperature data covers all physical conditions. The values of the coefficient parameters of the predictive functional formulae are decided on the basis of the correlation between these temperature data and time data, and the optimum prediction function is specified.

Accordingly, sensed temperature that will prevail at a future time $t_c$ is calculated in accordance with the following equation using the specified prediction function:

$$T_p(t_c) = A_0 + A_1/t_c + A_2/t_c^2 + A_3/t_c^3$$

Operation

Figure 10A:
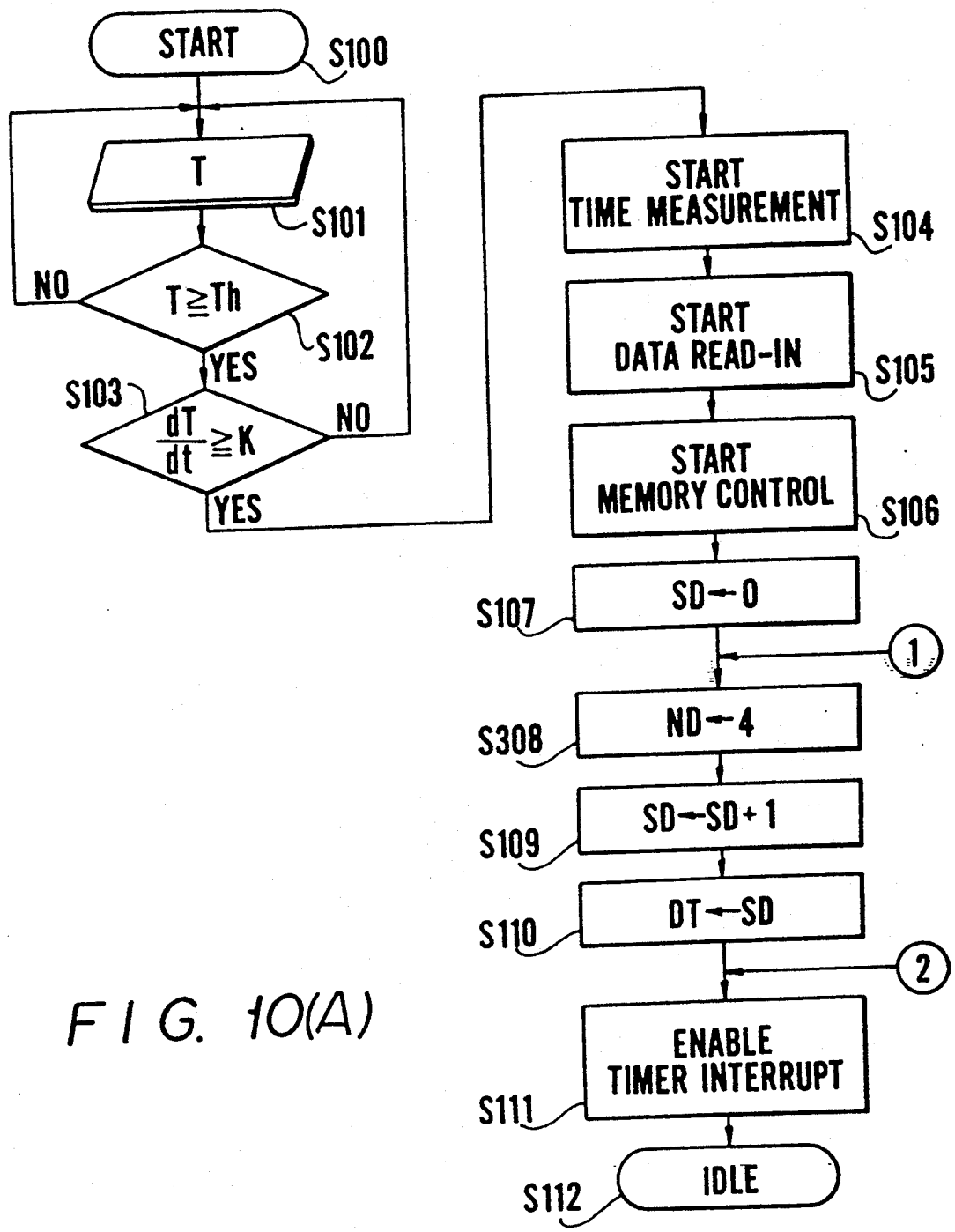
FIGS. 10(A) and 10(B) are flowcharts showing temperature sensing processing executed in the second embodiment of the electronic clinical thermometer.
Figure 10B:
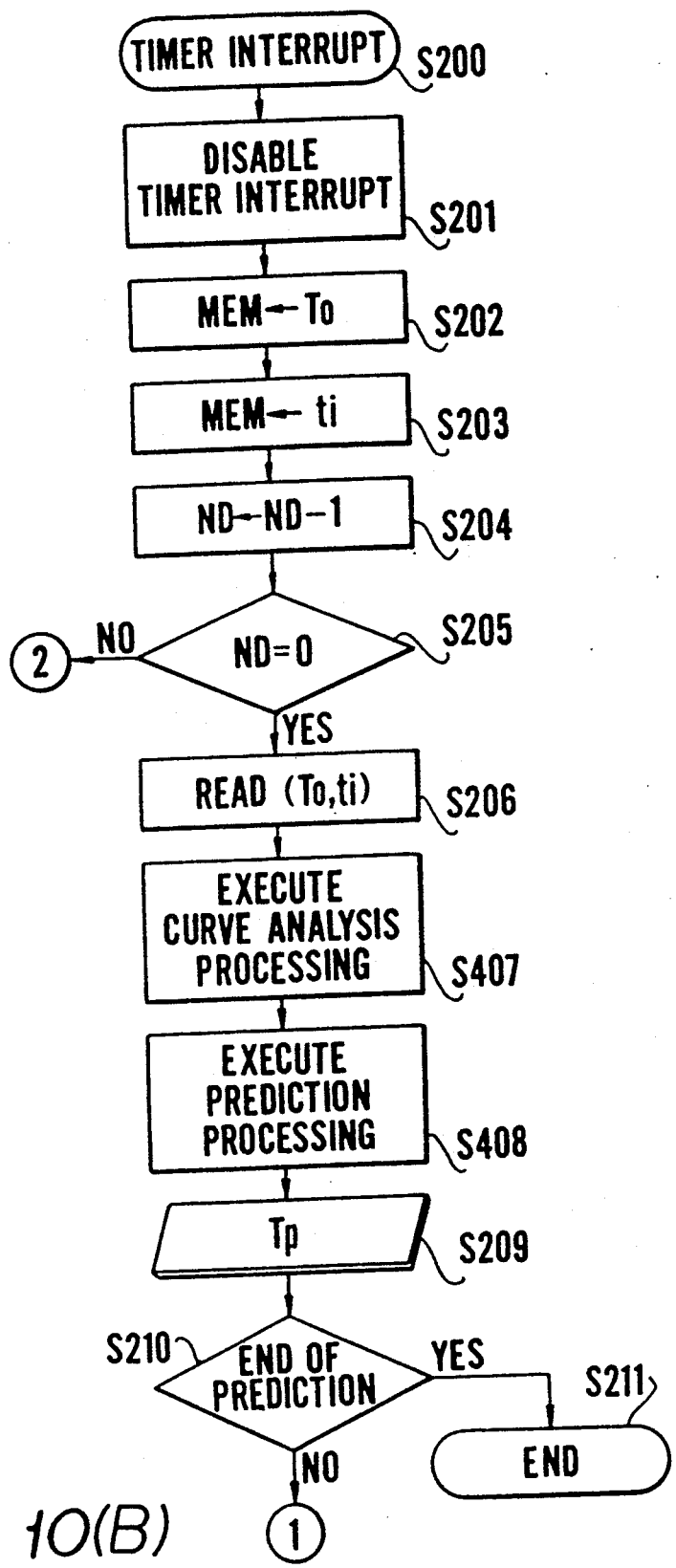

FIGS. 10(A) and 10(B) are flowcharts showing temperature sensing processing executed in the second embodiment of the electronic clinical thermometer. Steps in FIGS. 10(A) and 10(B) identical with those in FIGS. 3(A) and 3(B) are designated by like step numbers and need not be described again. In FIG. 10(A), the counter SD is cleared at step S107, and the counter ND is set to 4 at step S108. The count in counter SD is incremented at step S109, and the count in counter SD is set in the register DT at step S110. A timer interrupt at a rate of once per second is enabled at step S111, and the CPU executes an idle routine at step S112 to await the occurrence of the timer interrupt When a decision is rendered at step S205 to the effect that the count in counter ND is zero in FIG. 10(B), this means that four items of temperature data have been accumulated, so that the program proceeds to step S206, at which the temperature data $T_0(t_i)$ and each item of elapsed measurement time data $t_i$ accumulated in the memory means 9 are read out to the data analyzing means 21 by the memory control means 20. In this case, the four sets of data initially read out by the memory control means 20 are temperature data $D_0$ and time data $t_0$ (=one second), temperature data $D_1$ and time data $t_1$ (=two seconds), ..., and temperature data $D_3$ and time data $t_3$ (=four seconds). This is followed by a step S207, at which the data analyzing means 21 solves the following simultaneous equations on the basis of these data:

$$[D_0 = A_0 + A_1/t_0 + A_2/t_0^2 + A_3/t_0^3]$$

$$[D_1 = A_0 + A_1/t_1 + A_2/t_1^2 + A_3/t_1^3]$$

$$[D_2 = A_0 + A_1/t_2 + A_2/t_2^2 + A_3/t_2^3]$$

$$[D_3 = A_0 + A_1/t_3 + A_2/t_3^2 + A_3/t_3^3]$$

In general, the values of the coefficient parameters $A_0 \sim A_3$ of the predictive functional formulae can be obtained by the following equations:

$$A_0 = (Y_2 - X_2)/(t_3 - t_0)$$

$$A_1 = X_2 - A_0(t_0 + t_1 + t_2)$$

$$A_2 = X_1 - A_1(t_0 + t_1) - A_0(t_0^2 + t_0 t_1 + t_1^2)$$

$$A_3 = t_0^3 D_0 - t_0^2 A_1 - t_0 A_2 - t_0^3 A_0$$

where $$X_2 = (Y_1 - X_1)/(t_2 - t_0)$$

$$Y_2 = (Z_1 - Y_1)/(t_3 - t_1)$$

$$X_1 = (t_1^3 D_1 - t_0^3 D_0)/(t_1 - t_0)$$

$$Y_1 = (t_2^3 D_2 - t_1^3 D_1)/(t_2 - t_1)$$

$$Z_1 = (t_3^3 D_3 - t_2^3 D_2)/(t_3 - t_2)$$

The same will hold even if the time interval of the data is different.

When the data are read through the method of FIG. 11(A), the calculation of the values of the coefficient parameters $A_0 \sim A_3$ is very simple, as shown hereinbelow. Specifically, let SD be the time for reading out the initial temperature data and DT the time interval of each of the items of temperature data that follow the initial data. Then, if the following holds:

$$SD = 1, 2, 3, 4, \ldots (SEC)$$

$$DT = SD$$

one would have $$A_0 = (64D_3 - 81D_2 + 24D_1 - D_0)/6$$

$$A_1 = (32D_3 - 27D_2 + 4D_1 - 9A_0)/SD$$

$$A_2 = (8D_1 - D_0 - 7A_0)SD^2 - 3A_1 SD$$

$$A_3 = D_0 - A_1 SD^2 - A_2 SD - A_0 SD^3$$

When the data are read through the method of FIG. 11(B), the elapsed measurement time data $t_i$ are expressed as follows:

$$T_i = SD + DT * i (i = 0, 1, 2, 3)$$

$$DT = 1, 2, 3, 4, \ldots$$

Note that SD is fixed at "1". Calculation of the values of the coefficient parameters $A_0 \sim A_3$ is simple even in this case, as shown hereinbelow. Specifically $$A_0 = (Y_2 - X_2)DT/3$$

$$A_1 = X_2 - (3 + 3DT)A_0$$

$$A_2 = X_1 - (2 + DT)A_1 - (3 + 3DT + DT^2)A_0$$

$$A_3 = D_0 - A_1 - A_2 - A_0$$

where $$X_2 = (Y_1 - X_1)DT/2$$

$$Y_2 = (Z_1 - Y_1)DT/2$$

$$X_1 = (t_1^3 D_1 - D_0)/DT$$

$$Y_1 = (t_2^3 D_2 - t_1^3 D_1)/DT$$

$$Z_1 = (t_3^3 D_3 - t_2^3 D_2)/DT$$

Next, at a step S208, the values of the coefficient parameters $A_0 \sim A_3$ determined by the data analyzing means 21 are sent to the prediction processing means 12, which, in accordance with the following equation, determines the predicted temperature $T_p(t_c)$ that will prevail at the measured region of the living body at the future time $t_c$:

$$T_p(t_c) = A_0 + A_1/t_c + A_2/t_c^2 + A_3/t_c^3$$

Since the elapsed measurement time $t_c$ can be set at will in accordance with the second embodiment of the invention, the value of sensed temperature that will prevail in the future upon elapse of any period of time can be predicted easily and accurately. That is, when the temperature that will prevail at thermal equilibrium is predicted, ideally $t_c$ is an infinite quantity. However, in consideration of ordinary temperature sensing practice, $t_c$ can be set to any prescribed value ranging from e.g. 300 to 600 seconds.

Figure 12:
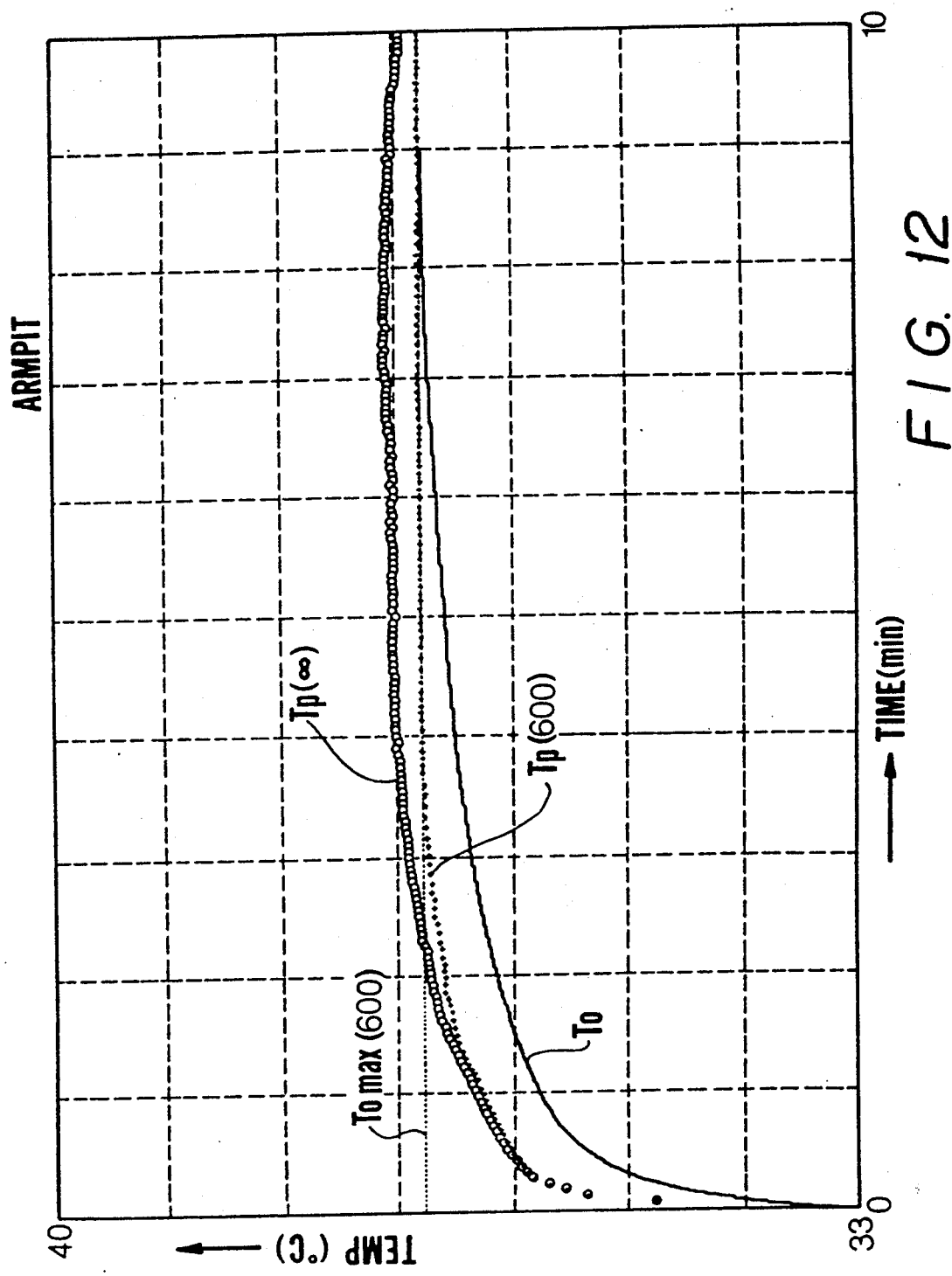
FIG. 12 is a graph showing the course of measurement when temperature is sensed in an armpit by the electronic clinical thermometer of the second embodiment.
Figure 13:
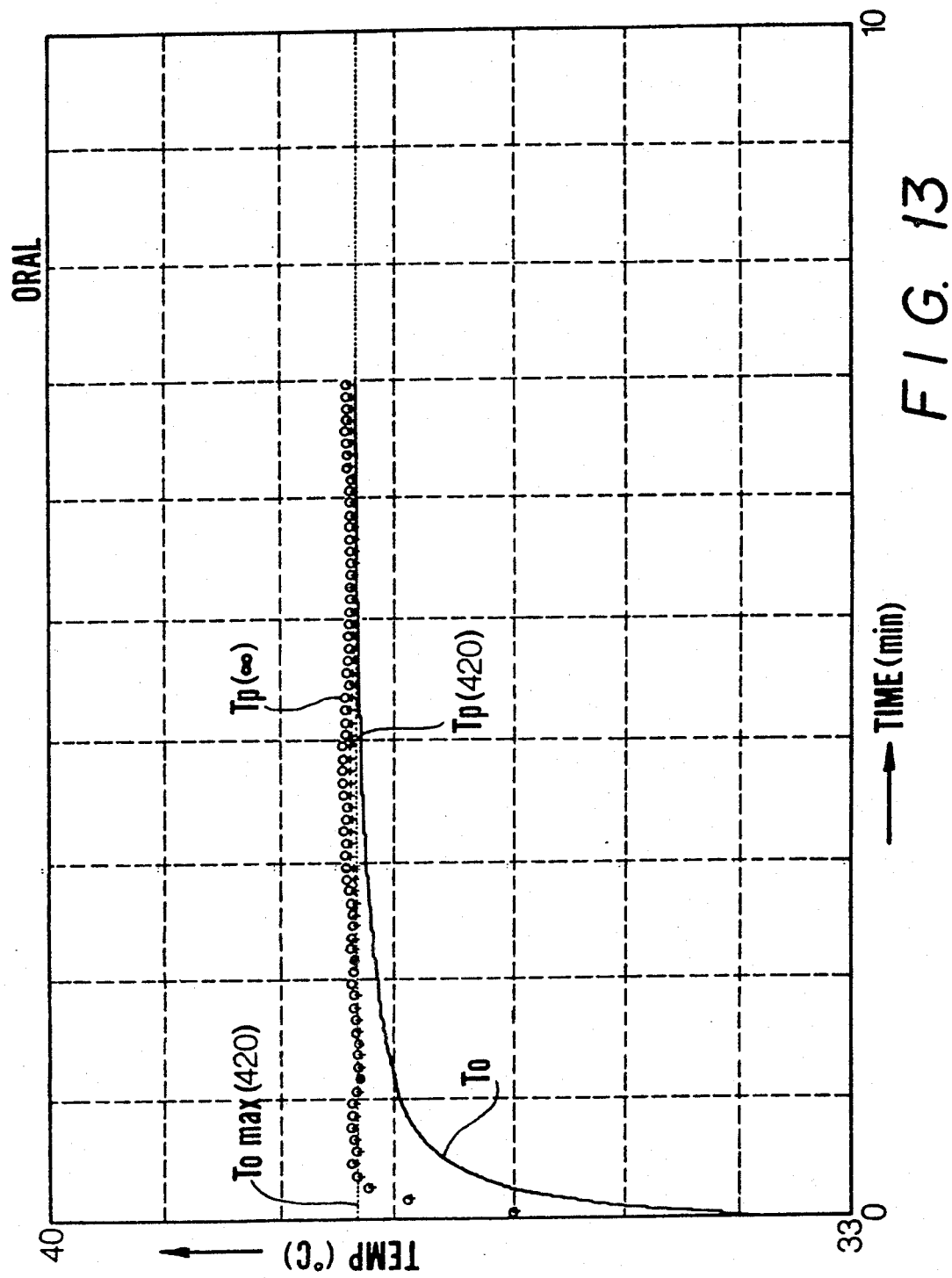
FIG. 13 is a graph showing the course of measurement when temperature is sensed orally by the electronic clinical thermometer of the second embodiment.
Figure 14:
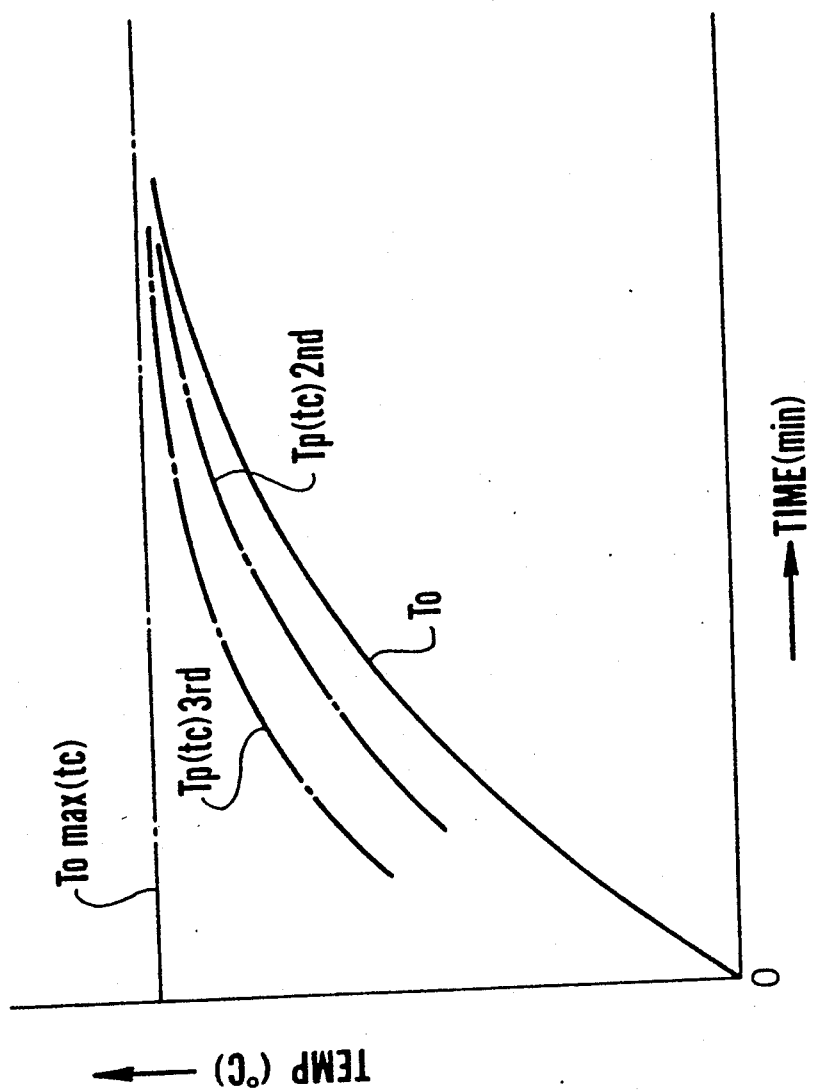
FIG. 14 is a graph illustrating the relationship between the degree of a predictive functional formula and a predictive functional curve in an embodiment of the invention.

FIG. 12 is a graph showing the course of measurement when temperature is sensed in an armpit by the electronic clinical thermometer of the second embodiment. Similarly, FIG. 13 is a graph showing the course of measurement when temperature is sensed orally by the electronic clinical thermometer. It will be understood from these graphs that the transitions of a predicted value $T_p(\infty)$ at thermal equilibrum, a predicted value $T_{p(420)}$ with regard to a sensed temperature value $T_{0max(420)}$ (420 seconds after the start of measurement), and a predicted value $T_{p(600)}$ with regard to a sensed temperature value $T_{0max(600)}$ 600 second after the start of measurement all describe extremely stable rise curves with respect to the temperature data $T_0$ sensed in the armpit and orally. In general, a dispersion in thermal characteristics when the temperature probes are mass-produced has little effect upon the shape of a body temperature measurement curve in comparison with differences between the regions of the body (armpit, mouth, etc.) at which the temperature is sensed. Therefore, even if probes are changed, the transition of the predicted values will still describe a stable rise curve. Though the time required for a predicted value to indicate the sensed temperature value that will prevail at a future time is not necessarily shorter than that required with the conventional prediction system, instability which is frequent in the conventional prediction system, such as overshooting in the vicinity of the rising edge of the measurement curve or extreme fluctuations in the predicted value due to noise superimposed on the actually measured temperature curve, is eliminated.

In accordance with the second embodiment of the invention as described above, all of the coefficients in the prediction formulae are calculated using real-time temperature data when a measurement is taken. This makes it possible to obtain an accurate, early display of temperature at all times even if temperature rise curves differ because of a dispersion in the thermal characteristics of the probe, or because of individual differences or differences in the part of a body where temperature is sensed.

Further, in accordance with the second embodiment, since real-time temperature data per se are used as purposive variables, there is no adverse influence ascribable to calculation error, the coefficient parameters can be decided stably, and predicted values do not fluctuate widely even when noise is superimposed on an actually measured temperature curve.

Moreover, in accordance with the second embodiment, temperature data are sampled in such a manner that all temperature rise curves at each moment of elapsed measurement time are covered Accordingly, the transition of the predicted value describes a natural rise curve and there is no overshoot in the vicinity of temperature rise. This makes it possible for a measurement to be taken without the user being aware of the fact that a prediction is being made.

In accordance with the second embodiment, any future time can be set with regard to a prediction formula. Therefore, a sensed temperature value which prevails after any elapsed measurement time can be provided with ease. This also makes it possible to provide a predicted value of thermal equilibrium temperature which will prevail in the future after a very long elapsed time period.

In accordance with the second embodiment, calculations can be performed very simply by solving the afore-mentioned simultaneous equations. This makes it possible to realize a simply constructed electronic clinical thermometer in which the processing also is simple.

In the description of the foregoing embodiments, the right side of equation (10) is limited to terms up to the third degree. However, it is possible to change the degree if desired. If the degree is reduced, however, the effectiveness of the prediction will diminish. If the degree is reduced from the third to the second, for example, the transition of the second-degree predicted values will occupy a region between the transition of the third-degree predicted values and the curve $T_0$ indicative of actual temperature measurement. If the degree is increased, on the other hand, solving the regression coefficients or the simultaneous equations will take time and the capacity of the memory needed for the calcuations must be increased.

It will be understood that if the body temperature measurement system in the heat conduction model of FIG. 5 is further divided into a large number of regions, the assumption that each region exhibits temperature uniformity will be more appropriate. In other words, it will be more appropriate to treat these regions as infinitesimal volume elements. If these regions are increased in number, the calculations will become more complicated, as in the manner of an exponential function, but the form of $T_p(t)$ can be analogized comparatively simply by pursuing an expansion of the above-described equations. For example, if the region between the skin and subcutaneous tissue is increased by one layer, simultaneous differential equations corresponding to equations (1) and (2) will involve three unknowns rather than two unknowns. If this is expanded, a third-degree equation of $dT_p(t)$ corresponding to equation (3) will be obtained. If this is expanded further using a Laplacian transformation, the denominator on the right side of the equation corresponding to equation (4) will be a third-degree equation of s. Letting these three solutions be represented by $S_1$, $S_2$ and $S_3$, the form of $T_p(t)$ finally obtained will be as follows:

$$T_p(t) = T_{sat} + \psi_1 e^{s_1 t} + \psi_2 e^{s_2 t} + \psi_3 e^{s_3 t}$$

when $S_1 \neq S_2$, $S_2 \neq S_3$, $S_3 \neq S_1$ holds;

$$T_p(t) = T_{sat} + \psi_4 e^{s_1 t} + \psi_5 e^{s_2 t} + \psi_6 t e^{s_1 t}$$

when $S_1 \neq S_2$, $S_1 = S_3$ holds; and $$T_p(t) = T_{sat} + \psi_7 e^{s_1 t} + \psi_8 t e^{s_1 t} + \psi_9 t^2 e^{s_1 t}$$

when $S_1 = S_2 = S_3$ holds.

Thus, with an increase in the number of regions, the form of $T_p(t)$ changes and can be analogized from the way the expansion is made without requiring recalculation. In other words, even if the system is divided into a large number of regions, the $T_p(t)$ obtained will be transformed as shown by equation (9) if it is subjected to a Taylor expansion. Therefore, the same results will be obtained in accordance with the foregoing reasoning.

What is claimed is:

1. An electronic clinical thermometer for predicting a sensed temperature that will prevail at a future time, comprising:

first memory means for storing a predetermined predictive functional formula in which values of predetermined coefficient parameters for superimposing said prediction function on a sensed temperature curve are undetermined;

temperature sensing means for sensing temperature and generating temperature data indicative of the temperature sensed;

time signal generating means for measuring elapsed time from start of temperature measurement and generating time data indicative of the measured elapsed time;

second memory means for storing the sensed temperature data in a manner correlated with the time data that prevailed when the temperature data were sensed;

data reading means for reading plural items of temperature data out of said second memory means by a predetermined method as measurement proceeds;

signal analyzing means for setting values of said coefficient parameters by solving simultaneous equations constituted by a plurality of said predictive functional formulae, in which the read temperature data serve as purposive variables and functions of the time data related to these temperature data serve as explicative variables; and prediction processing means for calculating sensed temperature that will prevail at a future time in accordance with said predictive functional formula specified by the set values of the coefficient parameters.

2. The electronic clinical thermometer according to claim 1, wherein said signal analyzing means sets the values of coefficient parameters $A_0, A_1, A_2, \ldots, A_N$ of said predictive functional formula by solving the following simultaneous equations constituted by the plurality of predictive functional formulae:

$$T_0(t_i) = A_0 + A_1/t_i + A_2/t_i^2 + A_3/t_i^3 + \ldots + A_N/t_i^N$$

in which read temperature data $T_0(t_i)$ serve as purposive variables and functions $1/t_i, 1/t_i^2, 1/t_i^3, \ldots, 1/t_i^N$ of time data related to these temperature data serve as explicative variables.

3. The electronic clinical thermometer according to claim 2, wherein said prediction processing means performs prediction processing by calculating a sensed temperature $T_p(t_c)$, which will prevail at a future time $t_c$, in accordance with the following equation:

$$T_p(t_c) = A_0 + A_1/t_c + A_2/t_c^2 + A_3/t_c^3 + \ldots + A_N/t_c^N$$

based on a predictive functional formula specified by the values of the respective coefficient parameters $A_0, A_1, A_2, \ldots, A_N$ set by said signal analyzing means.

4. The electronic clinical thermometer according to claim 1, wherein said data reading means reads plural items of temperature data in such a manner that a time interval of time data related to plural items of temperature data read later is greater than a time interval of time data related to a plural items of temperature data read previously.

* * * * *